(12) United States Patent
Thakkar et al.

(10) Patent No.: US 9,547,516 B2
(45) Date of Patent: Jan. 17, 2017

(54) METHOD AND SYSTEM FOR MIGRATING VIRTUAL MACHINES IN VIRTUAL INFRASTRUCTURE

(71) Applicant: Nicira, Inc., Palo Alto, CA (US)

(72) Inventors: Sachin Thakkar, San Jose, CA (US); ChiHsiang Su, Santa Clara, CA (US); Jia Yu, Sunnyvale, CA (US); Piyush Kothari, Palo Alto, CA (US); Nilesh Ramchandra Nipane, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 24 days.

(21) Appl. No.: 14/466,998

(22) Filed: Aug. 23, 2014

(65) Prior Publication Data

US 2016/0055019 A1 Feb. 25, 2016

Related U.S. Application Data

(60) Provisional application No. 62/041,003, filed on Aug. 22, 2014.

(51) Int. Cl.
*G06F 9/455* (2006.01)
*G06F 11/20* (2006.01)
(Continued)

(52) U.S. Cl.
CPC ....... *G06F 9/45558* (2013.01); *G06F 11/2033* (2013.01); *H04L 41/082* (2013.01);
(Continued)

(58) Field of Classification Search
None
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

WO    WO 2013/184846    12/2013

OTHER PUBLICATIONS

U.S. Appl. No. 14/466,996, filed Aug. 23, 2014, Thakkar, Sachin, et al.

(Continued)

*Primary Examiner* — Emerson Puente
*Assistant Examiner* — Jonathan R Labud
(74) *Attorney, Agent, or Firm* — Adeli LLP

(57) ABSTRACT

A method of migrating a data compute node (DCN) in a datacenter comprising a plurality of host physical computing devices, a compute manager, and a network manager is provided. The method by the network manager configures a plurality of logical networks and provides a read-only configuration construct of at least one of the plurality of logical networks to the virtualization software of each host. The construct of each logical network includes a unique identification of the logical network. The method by the compute manager obtains the unique identification of one or more of the logical networks, determining that a particular logical network is available on first and second hosts based on the unique identification of the particular logical network, and configures a first DCN to move from the first host to the second host based on the determination that the first and second hosts are on the particular logical network.

20 Claims, 18 Drawing Sheets

(51) Int. Cl.
*H04L 12/24* (2006.01)
*H04L 12/931* (2013.01)
*H04L 12/26* (2006.01)

(52) U.S. Cl.
CPC ...... *H04L 41/0806* (2013.01); *H04L 41/0813* (2013.01); *H04L 41/0886* (2013.01); *H04L 41/12* (2013.01); *H04L 43/0876* (2013.01); *H04L 49/70* (2013.01); *G06F 2009/4557* (2013.01)

(56) References Cited

U.S. PATENT DOCUMENTS

| | | | |
|---|---|---|---|
| 5,729,685 A | 3/1998 | Chatwani et al. | |
| 5,751,967 A | 5/1998 | Raab et al. | |
| 5,796,936 A | 8/1998 | Watabe et al. | |
| 6,104,699 A | 8/2000 | Holender et al. | |
| 6,219,699 B1 | 4/2001 | McCloghrie et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,963,585 B1 | 11/2005 | Le Pennec et al. | |
| 7,079,544 B2 | 7/2006 | Wakayama et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,286,490 B2 | 10/2007 | Saleh et al. | |
| 7,359,971 B2 | 4/2008 | Jorgensen | |
| 7,450,598 B2 | 11/2008 | Chen et al. | |
| 7,483,370 B1 | 1/2009 | Dayal et al. | |
| 7,606,260 B2 | 10/2009 | Oguchi et al. | |
| 7,649,851 B2 | 1/2010 | Takashige et al. | |
| 7,710,874 B2 | 5/2010 | Balakrishnan et al. | |
| 7,730,486 B2 | 6/2010 | Herington | |
| 7,792,987 B1 | 9/2010 | Vohra et al. | |
| 7,802,251 B2 | 9/2010 | Kitamura | |
| 7,818,452 B2 | 10/2010 | Matthews et al. | |
| 7,826,482 B1 | 11/2010 | Minei et al. | |
| 7,885,276 B1 | 2/2011 | Lin | |
| 7,912,955 B1 | 3/2011 | Machiraju et al. | |
| 7,925,850 B1 | 4/2011 | Waldspurger et al. | |
| 7,937,438 B1 | 5/2011 | Miller et al. | |
| 7,948,986 B1 | 5/2011 | Ghosh et al. | |
| 8,027,354 B1 | 9/2011 | Portolani et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,102,781 B2 | 1/2012 | Smith | |
| 8,166,201 B2 | 4/2012 | Richardson et al. | |
| 8,194,680 B1 * | 6/2012 | Brandwine | H04L 61/103 370/398 |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,312,129 B1 | 11/2012 | Miller et al. | |
| 8,456,984 B2 | 6/2013 | Ranganathan et al. | |
| 8,504,718 B2 | 8/2013 | Wang et al. | |
| 8,621,058 B2 | 12/2013 | Eswaran et al. | |
| 8,644,188 B1 | 2/2014 | Brandwine et al. | |
| 8,705,513 B2 | 4/2014 | Van Der Merwe et al. | |
| 2003/0093481 A1 | 5/2003 | Mitchell et al. | |
| 2004/0047286 A1 | 3/2004 | Larsen et al. | |
| 2004/0073659 A1 | 4/2004 | Rajsic et al. | |
| 2004/0098505 A1 | 5/2004 | Clemmensen | |
| 2004/0267897 A1 | 12/2004 | Hill et al. | |
| 2005/0018669 A1 | 1/2005 | Arndt et al. | |
| 2005/0038834 A1 | 2/2005 | Souder et al. | |
| 2005/0083953 A1 | 4/2005 | May | |
| 2005/0120160 A1 | 6/2005 | Plouffe et al. | |
| 2006/0002370 A1 | 1/2006 | Rabie et al. | |
| 2006/0026225 A1 | 2/2006 | Canali et al. | |
| 2006/0092861 A1 * | 5/2006 | Corday | H04L 67/34 370/256 |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0184937 A1 | 8/2006 | Abels et al. | |
| 2006/0193266 A1 | 8/2006 | Siddha et al. | |
| 2007/0043860 A1 | 2/2007 | Pabari | |
| 2007/0156919 A1 | 7/2007 | Potti et al. | |
| 2007/0220358 A1 | 9/2007 | Goodill et al. | |
| 2007/0260721 A1 | 11/2007 | Bose et al. | |
| 2007/0283348 A1 | 12/2007 | White | |
| 2007/0297428 A1 | 12/2007 | Bose et al. | |
| 2008/0002579 A1 | 1/2008 | Lindholm et al. | |
| 2008/0040467 A1 | 2/2008 | Mendiratta et al. | |
| 2008/0049621 A1 | 2/2008 | McGuire et al. | |
| 2008/0059556 A1 | 3/2008 | Greenspan et al. | |
| 2008/0071900 A1 | 3/2008 | Hecker et al. | |
| 2008/0159301 A1 | 7/2008 | de Heer | |
| 2008/0165704 A1 | 7/2008 | Marchetti et al. | |
| 2009/0296726 A1 | 12/2009 | Snively et al. | |
| 2010/0125667 A1 | 5/2010 | Soundararajan | |
| 2011/0103259 A1 * | 5/2011 | Aybay | H04L 49/35 370/254 |
| 2011/0296052 A1 | 12/2011 | Guo et al. | |
| 2012/0147894 A1 | 6/2012 | Mulligan et al. | |
| 2013/0024579 A1 | 1/2013 | Zhang et al. | |
| 2013/0332602 A1 | 12/2013 | Nakil et al. | |
| 2013/0332619 A1 | 12/2013 | Xie et al. | |
| 2014/0373007 A1 | 12/2014 | Donnellan et al. | |
| 2015/0117179 A1 | 4/2015 | Sato | |

OTHER PUBLICATIONS

U.S. Appl. No. 14/466,997, filed Aug. 23, 2014, Thakkar, Sachin, et al.
U.S. Appl. No. 14/467,001, filed Aug. 23, 2014, Thakkar, Sachin, et al.
Author Unknown, "Apache Cassandra™ 1.2 Documentation," Jan. 13, 2013, 201 pages, DataStax.
Author Unknown, "Virtual Machine Backup Guide," Nov. 2007, pp. 1-78, VMare, Inc., Palo Alto, California.

* cited by examiner

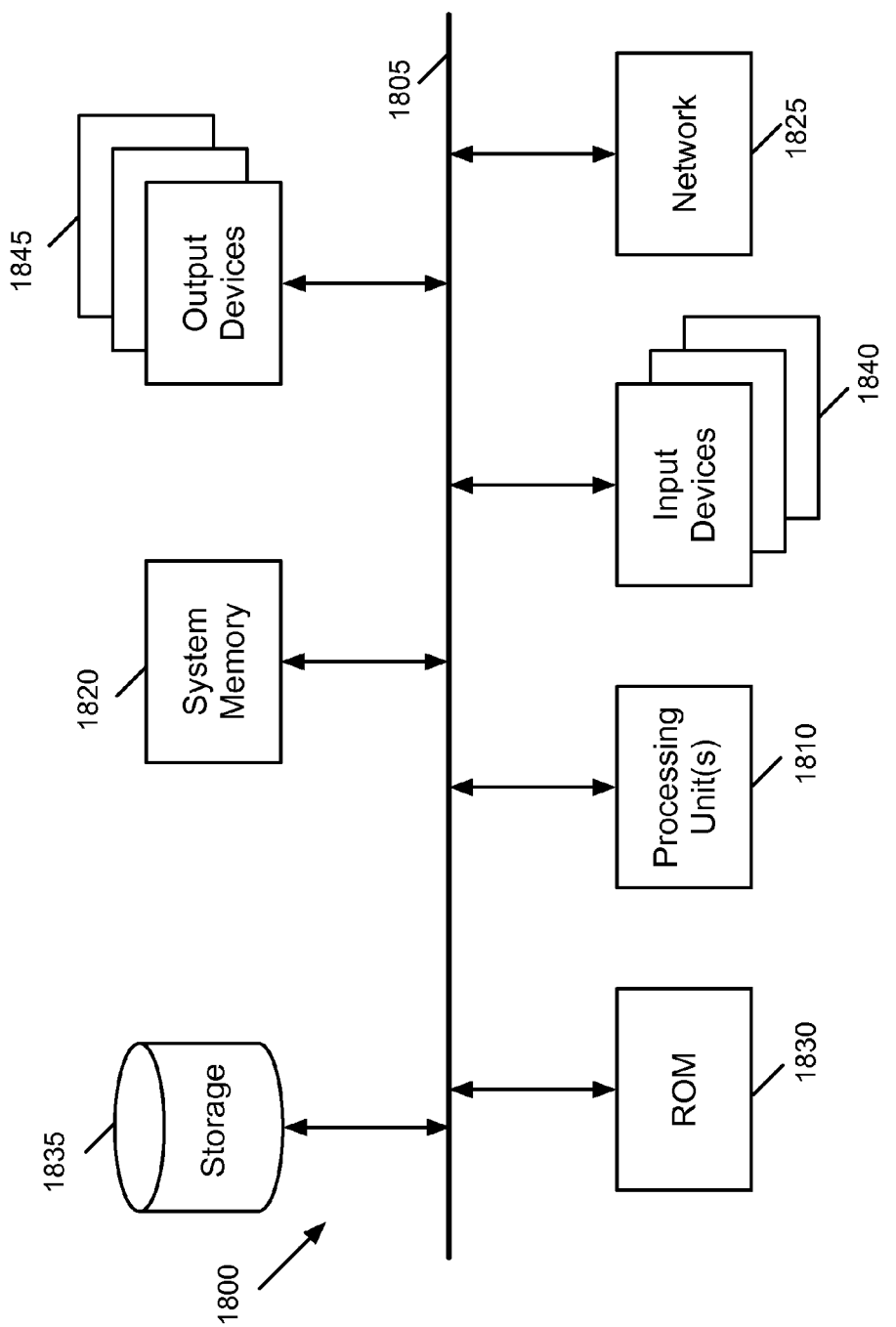

METHOD AND SYSTEM FOR MIGRATING VIRTUAL MACHINES IN VIRTUAL INFRASTRUCTURE

BACKGROUND

Today, the network presents a significant management overhead, especially in the virtual infrastructure. Programmable central management of networks, ports, and network services is critical to the success of allowing enterprise customers to evolve their operations to cloud-scale. This raises an issue that is front and center in the vision of software defined datacenter.

Today's network management constructs allow distributed configuration and scale-out of the virtual network but are tightly coupled to the compute management elements. This implicitly binds any solution to artificial constraints which are far exceeded by today's datacenter requirements of scale, configuration, and distribution for cloud networking. This expansion of virtual networks in harmony with network management orchestration is targeting the goal of a truly elastic datacenter.

One of the drawbacks of the current networking architecture is its tight coupling to the physical compute infrastructure and compute management layers. Today, if network administrators would like to manage the physical infrastructure, they must login into several physical switches. Today, in the virtual infrastructure, if a customer would like to manage the deployment of networks, they must log into several different compute manager instances. There is no central management portal for virtual networks, virtual ports and network services across the virtual infrastructure.

BRIEF SUMMARY

Methods and systems for virtual switch management are provided to assist the creation and consumption of workflows for logical networks (also referred to as virtual networks) and network services configured through any cloud management system (CMS) while remaining independent of the compute manager and virtualization software vendor and version. In some embodiments, the edge of the logical network infrastructure is controlled by a single networking platform that is decoupled from the compute manager and the CMS. In these embodiments, the logical network infrastructure is controlled by a higher level networking specific construct better equipped to present network centric viewpoint than the compute manager. The networking platform adds a layer of indirection that allows decoupling of datacenter infrastructure software.

In addition, once the logical network is created in a transport zone, the logical network is made visible to all hosts that are in the transport zone to allow the logical network interface controllers or virtual network interface controllers (VNICs) of the hosts virtual machines (VMs) to connect to the logical network. A transport zone is created to delineate the width of an overlay network. An overlay network is a network virtualization technology that achieves multi-tenancy in cloud computing environment. The workflow of publishing a logical network on a host is facilitated in some embodiments by the central network management entity sending a message regarding the newly created logical network to the virtualization software of each host where the logical network is available.

The network manager assigns a universally unique identifier (UUID) to the logical network and sends the UUID to the hosts. The UUID is locally stored at the host virtualization software's node management server. This data is periodically re-synched and a heartbeat mechanism maintains state synch. In essence, the network configuration is made available to the compute manager while the network manager remains the source of truth and maintains network configuration details. This allows the compute and network management entities to remain decoupled yet integrated.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 18 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
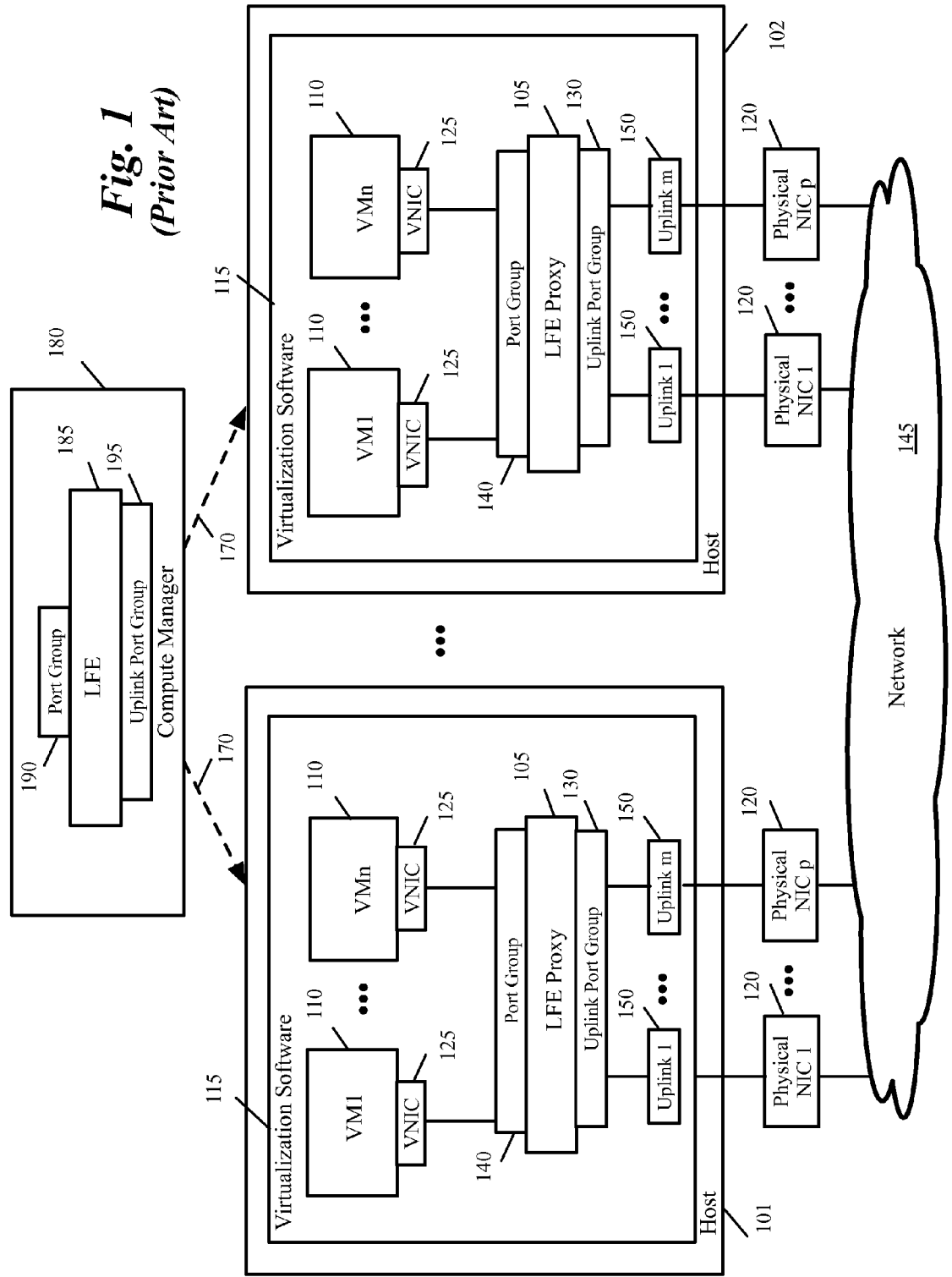
FIG. 1 conceptually illustrates a legacy virtualized infrastructure domain that uses a legacy logical forwarding element (LFE) model that relies on compute manager as the source of truth for the LFE.

Virtualization is the ability to simulate a hardware platform, such as a server, storage device or network resource, in software. A virtual machine (VM) is a software implementation of a machine such as a computer. Logical networks are abstractions of a physical network. VMs may communicate using logical networks. FIG. 1 conceptually illustrates a legacy virtualized infrastructure domain that uses a legacy logical forwarding element (LFE) model that relies on compute manager as the source of truth for the LFE. The compute manager is a component of the cloud management system (CMS) that is used to create and configure computing resources such as the VMs and the storage in the CMS.

The virtualized infrastructure domain includes a set of host machines 101-102 hosting multiple tenants. Each tenant has one or more VMs. For simplicity, the VMs 110 of only one tenant are shown. As shown, each host 101-102 includes virtualization software (sometimes referred to as a hypervisor) 115. The virtualization software shown in this figure are representative of the various types of virtualization software that may operate on hosts in such a virtualized infrastructure (e.g., virtual machine monitor, etc.). The VMs 110 of each tenant form a logical network (also referred to as private network or virtual network). The logical network is identified by a logical network identifier (also known as virtual network identifier or VNI). Each logical network is configured by a tenant. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks.

In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. A PFE forwards packets in a physical network whether or not it is implemented in software while a LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

In some embodiments, several PFEs are distributed throughout the network implement tenant's LFEs, where each PFE is a local instantiation, or a proxy 105, of an LFE that operate across different host machines and can perform L3 packet forwarding between VMs on the host machine or on different host machines. An LFE is sometimes referred to as a virtual distributed switch (VDS).

In each host, the LFE connects to one or more physical network interface controllers (PNICs) 120 to send outgoing packets and to receive incoming packets through a physical network 145. As shown, the LFE in FIG. 1 is defined to include one or more ports (or a port group) 130 through which it connects to uplinks 150 and the physical NICs 120 to send and receive packets. Each LFE is also defined to have a virtual port group 140 to connect to VMs 110 through virtual NICs (VNICs) 125 to the LFE. An uplink 150 is a module that relays packets between the LFE and the physical NIC in order to perform various packet processing functions on incoming and outgoing traffic.

LFEs were traditionally defined by the compute manager or by virtualization software and managed by the compute manager, which made them tightly coupled with the compute manager platform. As such, any new network feature or enhancement had to be tied with an update to the compute manager. FIG. 1 shows a legacy LFE model that relies on the compute manager as the source of truth (i.e., where the LFE can be defined and modified) for the LFE. As shown, the compute manager 180 creates the LFE 185 along with an uplink port group 195 and one or more virtual port groups 190.

Each LFE is associated to a logical network. The compute manager sends (as shown by 170) a copy of the LFE 185 and the port groups 190 and 195 to each host 101-102 where the logical network is available. The compute manager remains the source of truth for the LFE. For example, if modifications are made directly on the host to the LFE, the compute manager overwrites the modifications when it re-syncs at a periodic interval.

Figure 2:
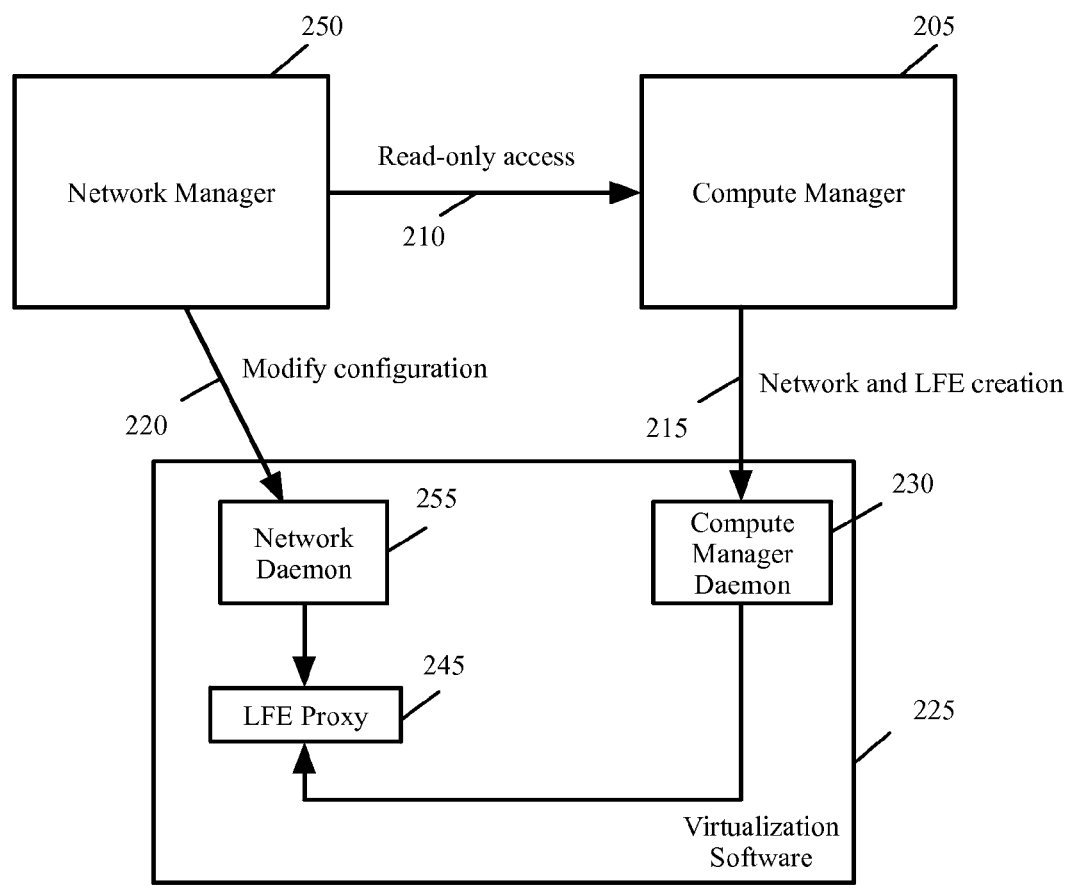
FIG. 2 conceptually illustrates the interactions of the compute manager and the virtualization software of a host to create an LFE by the compute manager and send a copy of the LFE to the host.

FIG. 2 conceptually illustrates the interactions of the compute manager and the virtualization software of a host to create an LFE by the compute manager and send a copy of the LFE to the host. The network manager (NM) 250 connects (as shown by 210) to compute manager 205 in a read-only fashion. The compute manager 205 receives a request to create a logical network (e.g., from the network manager through an API). The compute manager 205 creates the logical network and an LFE. The compute manager then sends (as shown by 215) a copy of the LFE through the compute manager daemon 230 on the virtualization software 225 of the host. A daemon (or an agent) refers to a process or software module that, for example, runs as a background task and answers requests for service.

The compute manager daemon 230 is the intermediary between the compute manager 205 and the virtualization software 225 on the host, which handles service requests that the virtualization software receives from the compute manager. The virtualization software 225 stores a copy (or a proxy) 245 of the LFE locally at the host. The network manager 250 then pushes (as shown by 220) additional configuration such as firewall rules, overlay technology, etc. for the network through the network daemon 255. The configurations received from the network manager in FIG. 2 are modifiers rather than the creator of the logical network and the LFE. The compute manager remains the source of truth and also does periodic re-synch with the logical network and the LFE.

I. Replacing the LFE as a Compute Manager Object

Some embodiments provide methods and systems to remove LFE's dependency on compute manager such that the LFE data path (i.e., the LFE proxy) in the virtualization software is managed by a single networking platform and is decoupled from the compute manager. In addition, some of these embodiments provide the traditional LFEs defined by the compute manager. These embodiments provide two different ways of defining LFEs: (1) the traditional way of defining LFEs using the compute manager (e.g., as described above by reference to FIGS. 1 and 2) and (2) defining the LFEs by the networking platform that is decoupled from the compute manager and exposing the LFEs for compute manager or host virtualization software consumption while maintaining the configuration of the LFEs only in the networking platform. Through the second approach, the LFEs managed by network manager fully decouple the compute manager dependency for LFE feature configuration.

The decoupled LFE port group no longer uses an LFE that is created by the compute manager on the host as the back plane (i.e., to connect to). Instead the decoupled LFE uses a port group that is created out of band through a network manager communication channel to the virtualization software. The compute manager is provided a read-only access to the decoupled LFE. Some embodiments provide two main types primarily for consumption purposes. A host level LFE type (referred to herein as an opaque LFE) and a network type (referred to in this document as an opaque network).

In some embodiments, each LFE or logical network of opaque type is identified by a name and a unique identifier such as a universally unique identifier (UUID). This allows updating the network manager without any changes to the compute manager and the virtualization software.

The network manager-created LFE and logical networks in some embodiments are identified opaque (e.g., by associating them with an "isOpaque" flag and setting the flag to true in the list of the virtualization software LFEs), thus they will be recognized as an opaque switch or opaque network by the compute manager, as opposed to a compute manager-created LFE proxy or logical network that are subject to the compute manager's changes. This flag indicates to the compute manager that this is an independently-managed switch (or network) that cannot be changed by the compute manager.

Figure 3:
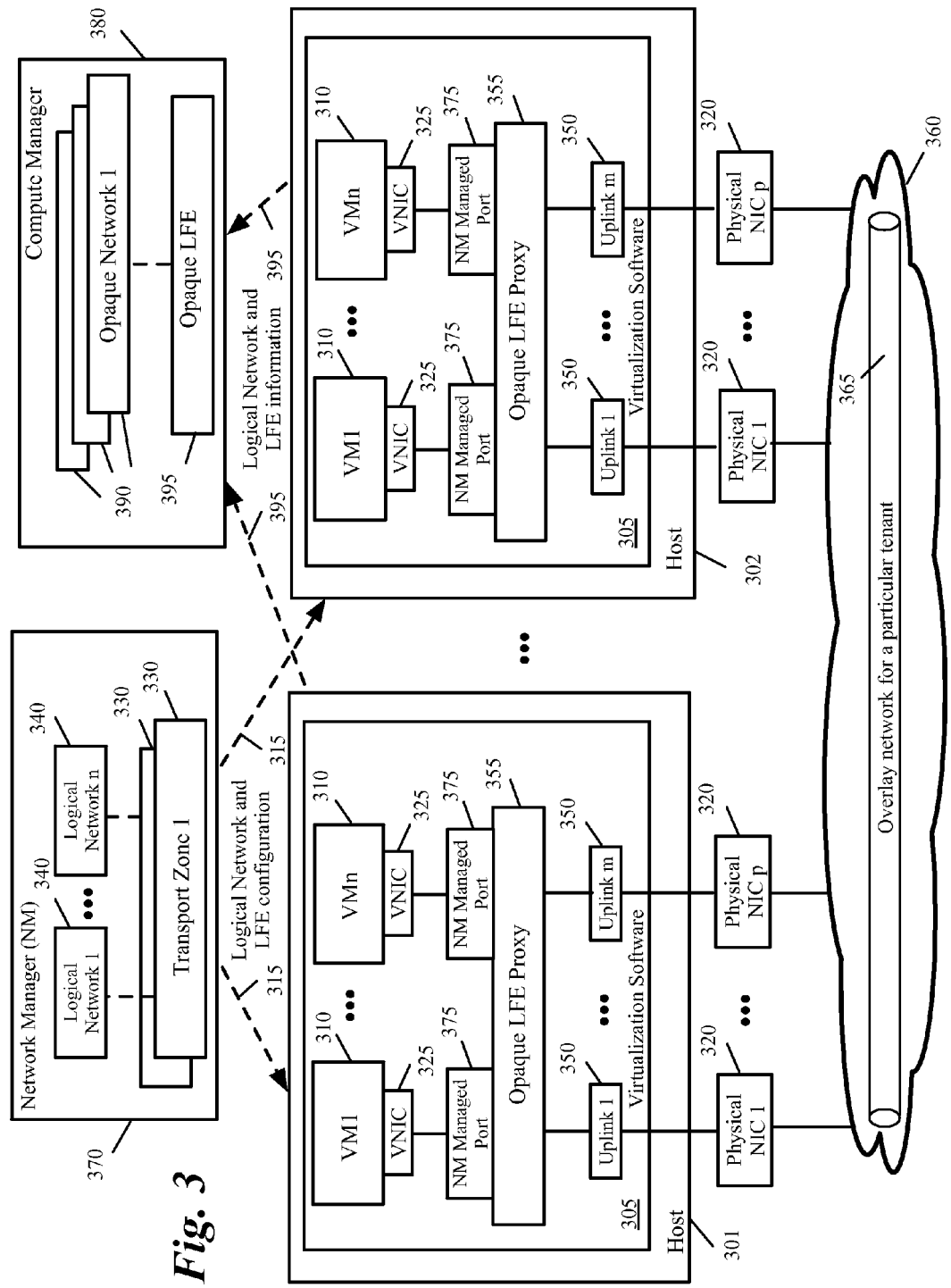
FIG. 3 conceptually illustrates the interactions of the network manger, the virtualization software, and the compute manager to create opaque networks and opaque LFEs by the network manager in some embodiments of the invention.

FIG. 3 conceptually illustrates the interactions of the network manger, the virtualization software, and the compute manager to create opaque networks and opaque LFEs by the network manager in some embodiments of the invention. As shown, the network manager 370 creates one or more logical networks 340. The network manager 370 associates the logical networks with one or more transport zones 330.

FIG. 3 conceptually shows the logical view that the network manager 370 has from the logical networks 340 and transport zones 330. A transport zone is the compute diameter, which defines the span of the network. The transport zone is created to delineate the width of an overlay network. An overlay network is a network virtualization technology that achieves multi-tenancy in cloud computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an Open Systems Interconnection (OSI) model Layer 2 (L2) overlay scheme over a Layer 3 (L3) network. VXLAN encapsulates an Ethernet L2 frame in IP (MAC-in-UDP encapsulation) and allows Virtual Machines (VM) to be a part of virtualized L2 subnets operating in separate physical L3 networks. Similarly, NVGRE uses Generic Routing Encapsulation (GRE) to tunnel L2 packets over L3 networks. Each host 301-302 acts as a tunnel end point. There is a unique identifier associated with each overlay network. For a VXLAN overlay network, the tunnel end point is known as Virtual Tunnel Endpoint (VTEP) and the unique identifier is referred to as the VXLAN (or "Virtual") Network Identifier (VNI).

Each transport zone is created to connect several transport Nodes. Examples of transport nodes include host virtualization software, virtual gateways providing L2 and L3 services, and hardware L2 Gateways. For instance, the host virtualization software might connect to one network for management traffic while connecting to a different network for VM traffic. The combination of a transport zone and the transport nodes provides the network manager the information to form tunnels between different hosts virtualization software to provide logical connectivity.

The network manager 370 sends (as shown by arrows 315) the logical network and LFE information to virtualization hosts that are connected to the same transport zone. The host flags the logical network and the LFE as opaque network and opaque LFE to prevent the compute manager 380 from attempting to modify them. The virtualization software 305 of each host maintains a proxy 355 of the opaque LFE.

As shown, each VM 310 connects to the opaque LFE proxy 355 through the virtual NICs 325. The opaque LFE proxy 355 includes a set of standalone opaque ports 375, which are created and managed by the network manager 370. The Opaque LFE proxy 355 connects to the physical NICs 320 through the uplinks 350. The physical NICs 320 connect to the tenant's overlay network 365 in the network 360. The overlay network traffic between a tenant's VMs 310 that are hosted on separate hosts 301-302 is passed through a tunnel of the overlay network 365 through the communication network 360. The communication network 360 may include the Internet, local area networks (LANs), wide area networks (WANs), different hardware equipment such as cables, routers, switches, etc.

FIG. 3 also conceptually shows the logical view that the compute manager 380 has from the opaque networks. The compute manager 380 has read-only access to the opaque LFE and opaque network information (as shown by arrows 395). The compute manager maintains records of the opaque network and opaque LFE (as conceptually shown by 390 and 395, respectively). The compute manager utilizes the information to create and/or connect VMs 310 to the opaque logical networks through the opaque LFE. The compute manager 380, however, does not control or modify the opaque networks and the opaque LFE. In other word, the network manager 370 is the source of truth for the opaque networks and LFEs.

Figure 4:
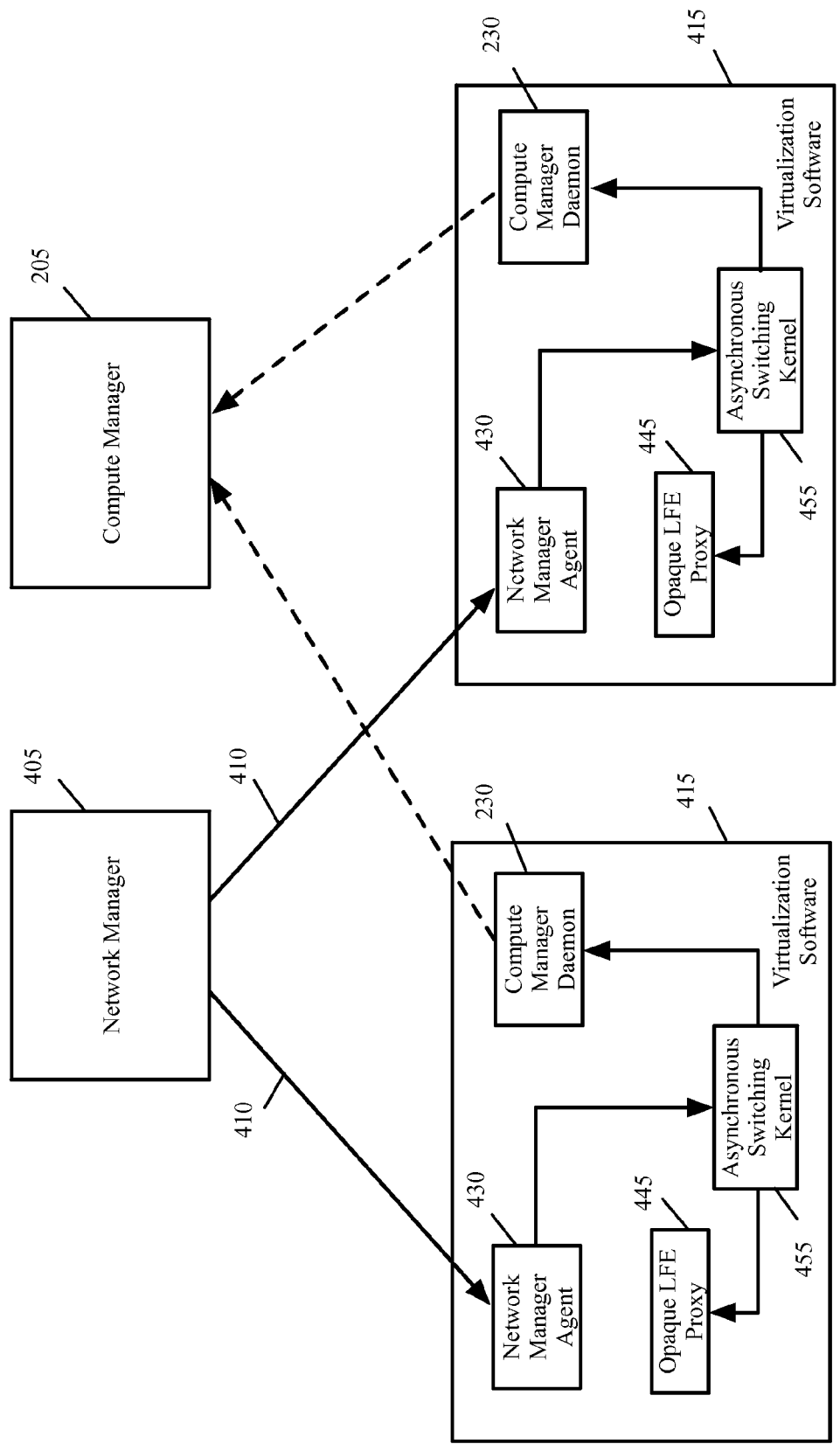
FIG. 4 conceptually illustrates the creation of one or more opaque logical networks and an opaque logical LFE by a network manager that is independent of the compute manager in some embodiments of the invention.

FIG. 4 conceptually illustrates the creation of one or more opaque logical networks and an opaque logical LFE by a network manager in some embodiments of the invention. The network manager is independent of the compute manager, the virtualization software, and their vendors and versions. For instance, the network manager can be updated independent of the compute manager or the virtualization software. The network manager can be deployed/redeployed in a datacenter without a need to deploy a new version of the compute manager or the virtualization software. The network manager 405 creates one or more opaque logical networks and an associated opaque LFE. The network manager 40 sends (as shown by arrows 410) the configuration information for the opaque LFE and the opaque networks to the hosts virtualization software 415-420 where the transport zones corresponding to the LFE are available.

As shown in FIG. 4, a network manager agent 430 is installed on each host's virtualization software 415. The network manager agent 430 receives the configuration information for the opaque networks and the opaque LFE. The network manager agent 430 communicates with an asynchronous switching kernel 455 in the virtualization software to create (or use an existing) an opaque LFE proxy 445 in the virtualization software 415. This process in some embodiments is performed through a switch management module within the network manager agent 430 that orchestrates bootstrapping of the switching layer, managing physical NICs, and the base infrastructure.

The network manager agent 430 is the intermediary between network manger 405 and the virtualization software 415. The network manager agent 430 passes the opaque LFE information to the asynchronous switching kernel 455 using e.g., link control protocol (LCP).

The network manager agent is developed and deployed separately than the virtualization software. The network manager agent provisions the network constructs that are used by the virtualization software. The virtualization software is an entity that is configured and deployed by the compute manager while the network manager agent that is deployed on the virtualization software is configured and deployed by the network manager. In some embodiments, the entire virtual network functionality used by the virtualization software is on the network manager agent and not on the virtualization software. The benefit of this arrangement is the network manager agent can be updated independent of the virtualization software. For instance, if a new port configuration to support an additional security or firewall feature is developed, the network manager agent can be redeployed on the virtualization software without a need to deploy a new version of the virtualization software.

The virtualization software 415 provides read-only information about the opaque LFE and the opaque networks to the compute manager 205 (e.g., through the switching kernel 455 and the compute manager daemon 230). The compute manager 205 uses the information to create VMs and connect them to the opaque LFE and the opaque networks without creating (or changing the configuration of) the opaque networks and opaque LFE. In the embodiment of FIG. 4, the network manager 405 is the only entity that creates and configures the opaque LFE and opaque network. The compute manager 205 and the host virtualization software 415 only have read-only access to the configuration information.

Figure 5:
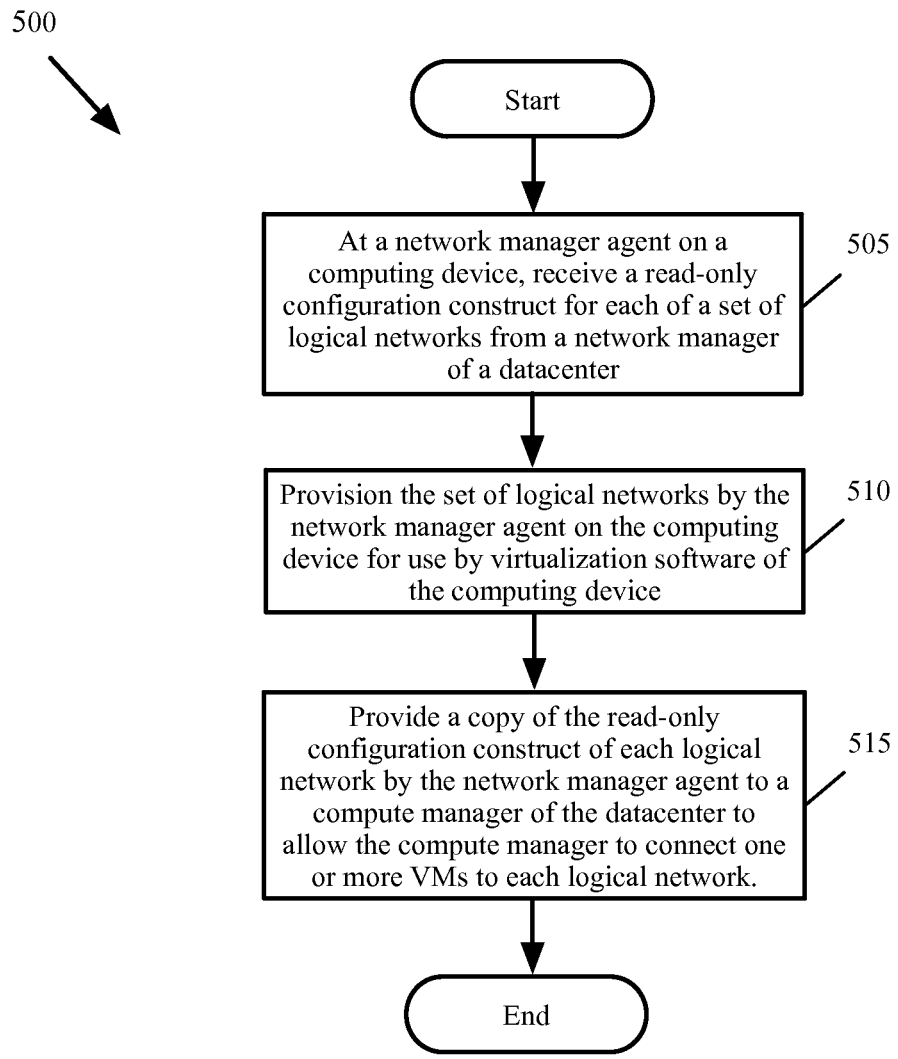
FIG. 5 conceptually illustrates a process for provisioning logical networks by a network manager agent deployed on a host computing device in some embodiments of the invention.

FIG. 5 conceptually illustrates a process 500 for provisioning logical networks by a network manager agent deployed on a host computing device in some embodiments of the invention. As shown, the network manager agent receives (at 505) a read-only configuration construct for each of a set of logical networks from a network manger of a datacenter. The logical networks are configured and managed by the network manager.

Next, the network manager agent provisions (at 510) the set of logical networks on the host for the use by the virtualization software of the host. The network manager agent then provides (at 515) a copy of all or a potion of the read-only configuration construct of each logical network to a compute manager of the datacenter. The network manager agent in some embodiments pushes the information to the compute manager. In other embodiments, the network manager sends the information to the compute manager on demand (i.e., the information is pulled by the compute manager). The compute manager utilizes the information to connect one or more VMs of the host to the logical network. The process then ends.

II. Deploying LFEs Created and Managed by Different Management Entities

In some embodiments, the network manager and the compute manager create different LFEs and logical networks and deploy them to the same host. These embodiments provide compatibility with the traditional datacenters where the LFEs are created and managed by the compute manager. These embodiments provide two different ways of defining LFEs: (1) the traditional way of defining LFEs using the compute manager (e.g., as described above by reference to FIGS. 1 and 2) and (2) defining the LFEs by the network manager of the networking platform that is decoupled from the compute manager (e.g., as described above by reference to FIGS. 3 and 4).

Figure 6:
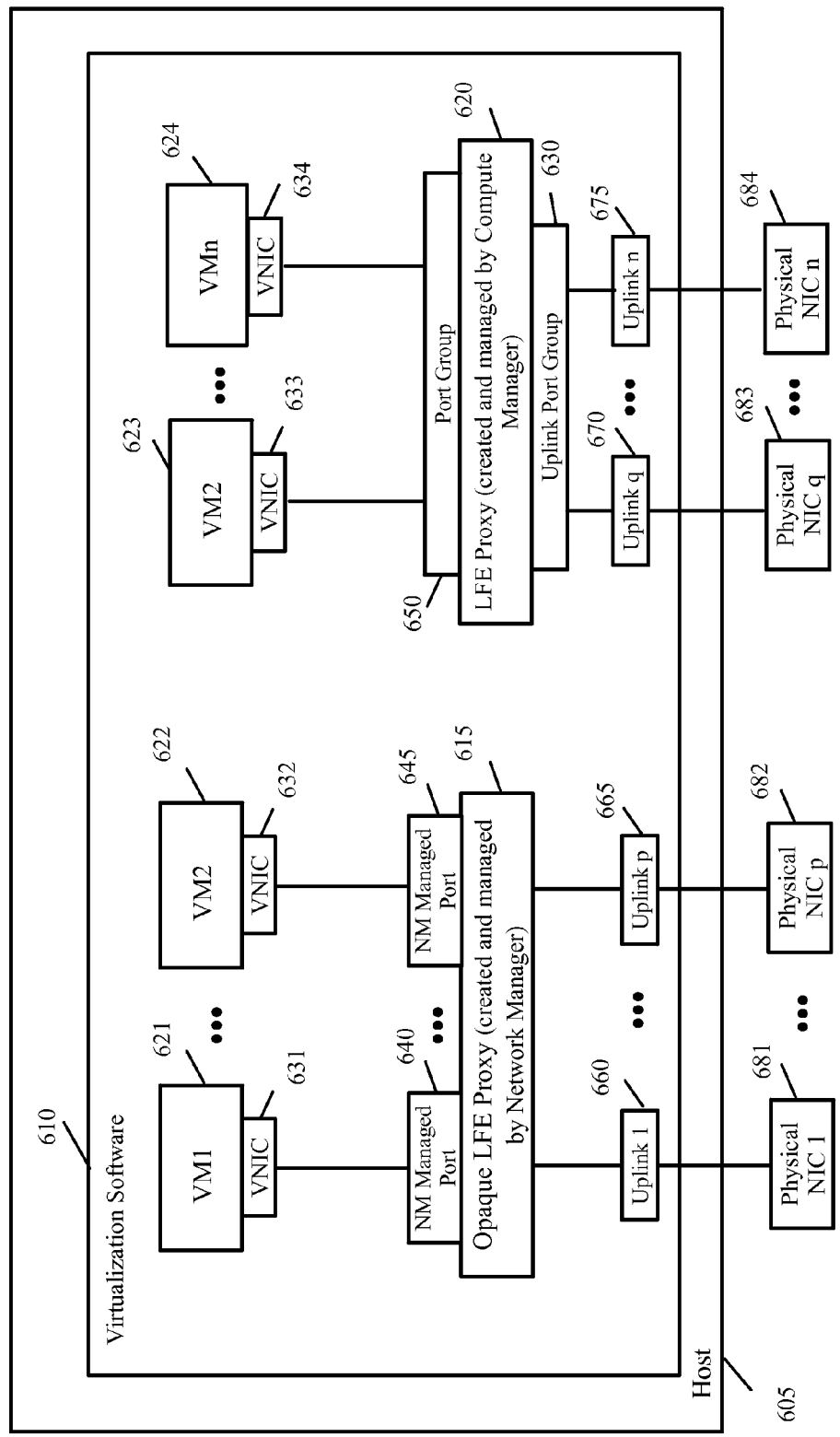
FIG. 6 conceptually illustrates the virtualization software of a host in some embodiments of the invention that includes two different LFEs created and managed by two different management entities.

FIG. 6 conceptually illustrates the virtualization software of a host in some embodiments of the invention that includes two different LFEs created and managed by two different management entities. As shown, the host 605 includes virtualization software 610 and a set of VMs 621-624. The virtualization software 610 includes a set of uplinks 660-675 that connect to a set of physical NICs (PNICs) 681-684.

The opaque LFE proxy 615 is the proxy of the opaque LFE that is created by the network manager. The opaque LFE includes several ports 640-645 that are configured and managed by the network manager. As shown, several VMs 621-622 are configured by the compute manager to connect (via VNICs 631-632) to the ports 640-645 that are created and managed by the network manager. These VMs are connected to the physical NICs through the opaque LFE 615 and the uplinks 660-665.

The virtualization software 610 also includes an LFE proxy 620 that is the proxy of an LFE that is created and managed by the compute manager. The LFE proxy 620 includes a port group 650 which is created and managed by the compute manager. The port group includes a set of ports. The LFE proxy 620 also includes an uplink port group 630, which is created and managed by the compute manager.

As shown, several VMs 623-624 are configured by the compute manager to connect to the port group 650 that is created and managed by the compute manager. These VMs are connected to the physical NICs 683-684 through the VNICS 633-634, LFE proxy 620, and the uplinks 670-675. As shown in FIG. 6, the virtualization software 610 of the host 605 at the same time includes two different LFEs that are created and managed by two different management stacks, namely the network manager and the compute manager. In the embodiment of FIG. 6, the compute manager only has read-only access to the opaque LFE 615 and the ports 640-645. The compute manager uses the read-only access to connect the VMs 621-622 to the opaque LFE 615 and the opaque logical networks that are created and managed by the network manager. On the other hand, the compute manager has full control to create, delete, and configure the LFE proxy 620, the port group 650, and the unlink port group 630.

Figure 7:
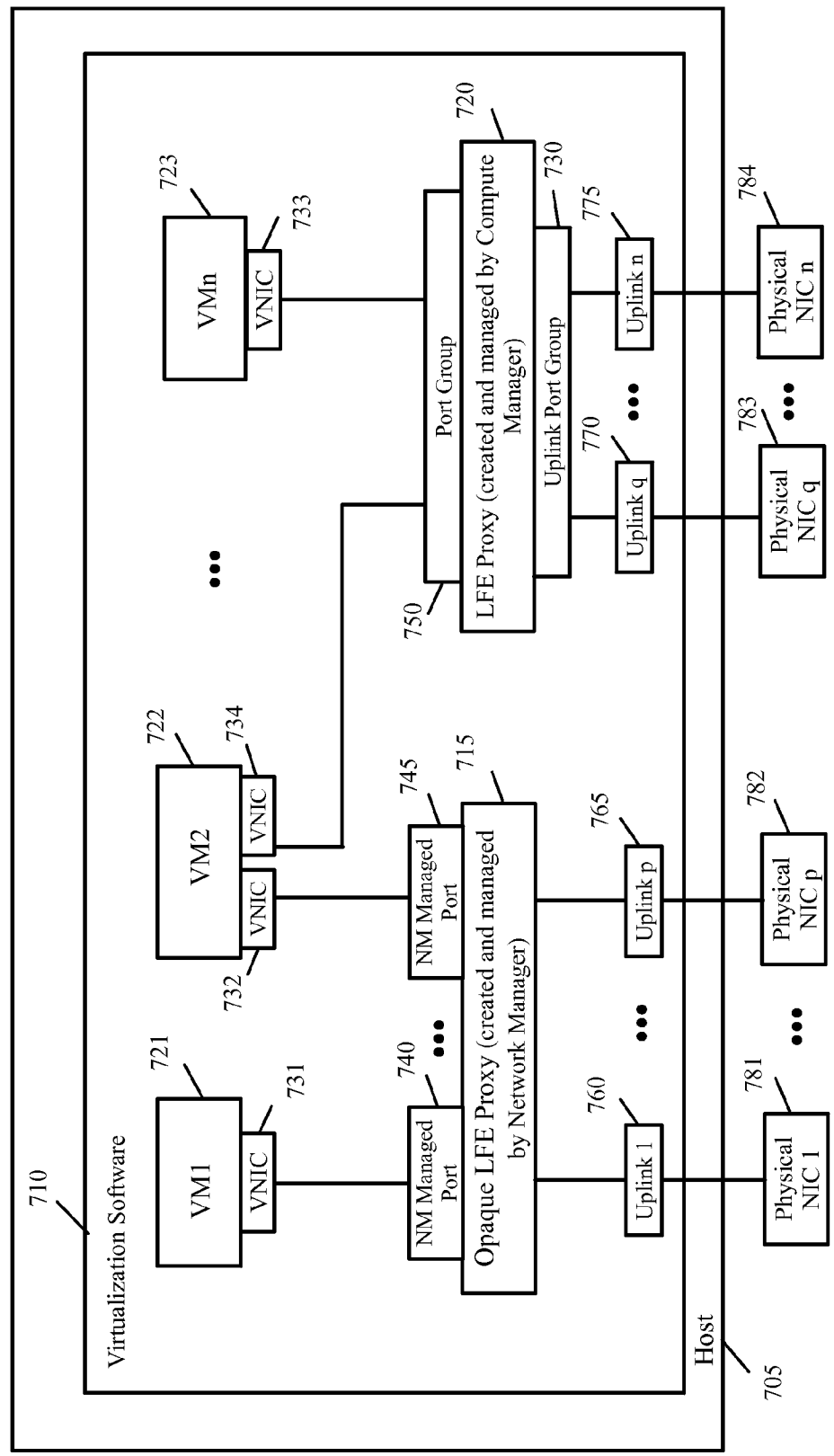
FIG. 7 conceptually illustrates the virtualization software of a host in some embodiments of the invention that includes two different LFEs created and managed by two different management entities, where one or more of the VMs are concurrently connected to both LFEs.

FIG. 7 conceptually illustrates the virtualization software of a host in some embodiments of the invention that includes two different LFEs created and managed by two different management entities, where one or more of the VMs are concurrently connected to both LFEs. As shown, the host 705 includes virtualization software 710 and a set of VMs 721-723. The virtualization software 710 includes a set of uplinks 760-775 that connect to a set of physical NICs 781-784.

The opaque LFE proxy 715 is the proxy of the opaque LFE that is created by the network manager. The opaque LFE proxy includes several ports 740-745 that are configured and managed by the network manager. As shown, some of the VMs such as VM 721 are configured by the compute manager to connect via VNIC 731 to the port 740 that is created and managed by the network manager. VM 721 is connected to the physical NIC 781 through the opaque LFE 715 and the uplink 760.

The virtualization software 710 also includes an LFE proxy 720 that is the proxy of an LFE that is created and managed by the compute manager. The LFE proxy 720 includes a port group 750, which is created and managed by the compute manager and includes a set of ports. The LFE proxy 720 also includes an uplink port group 730, which is created and managed by the compute manager.

As shown, VM 723 is configured by the compute manager to connect via VNIC 733 to the port group 750 that is created and managed by the network manager. VM 723 is connected to physical NICs 783-784 through the LFE proxy 720 and the uplinks 770-775. In addition, VM 722 is configured by the compute manager to concurrently connect to the opaque LFE proxy 715 and the LFE proxy 720. Although FIG. 7 shows only one VM connected only to opaque LFE proxy 715, only one VM connected to both opaque LFE proxy 715 and LFE proxy 720, and only one VM connected to only LFE proxy 720, it should be understood that any number of VMs may be so connected.

As shown, VM 722 includes two VNICs 732 and 734. VNIC 732 of VM 722 is connected to the opaque LFE proxy 715 through the port 745, which is created and managed by the network manager. The VNIC 734 of VM 722 is connected through the port group 750 to the LFE proxy 720, which is created and managed by the compute manager.

As shown in FIG. 7, the virtualization software 710 of the host 705 at the same time includes two different LFEs that are created and managed by two different management stacks, namely the network manager and the compute manager. In the embodiment of FIG. 7, the compute manager only has read-only access to the opaque LFE 715 and the ports 740-745. The compute manager uses the read-only access to connect VM 722 to the opaque LFE 715 and the opaque logical networks that are created and managed by the network manager. On the other hand, the compute manager has full control to create, delete, and configure the LFE proxy 720, the port group 750, and the unlink port group 730. The compute manager uses its own knowledge of the LFE proxy 720 and the port group 750 to connect VM 722 to the LFE proxy 750 and the logical networks that are created and managed by the compute manager.

Figure 8:
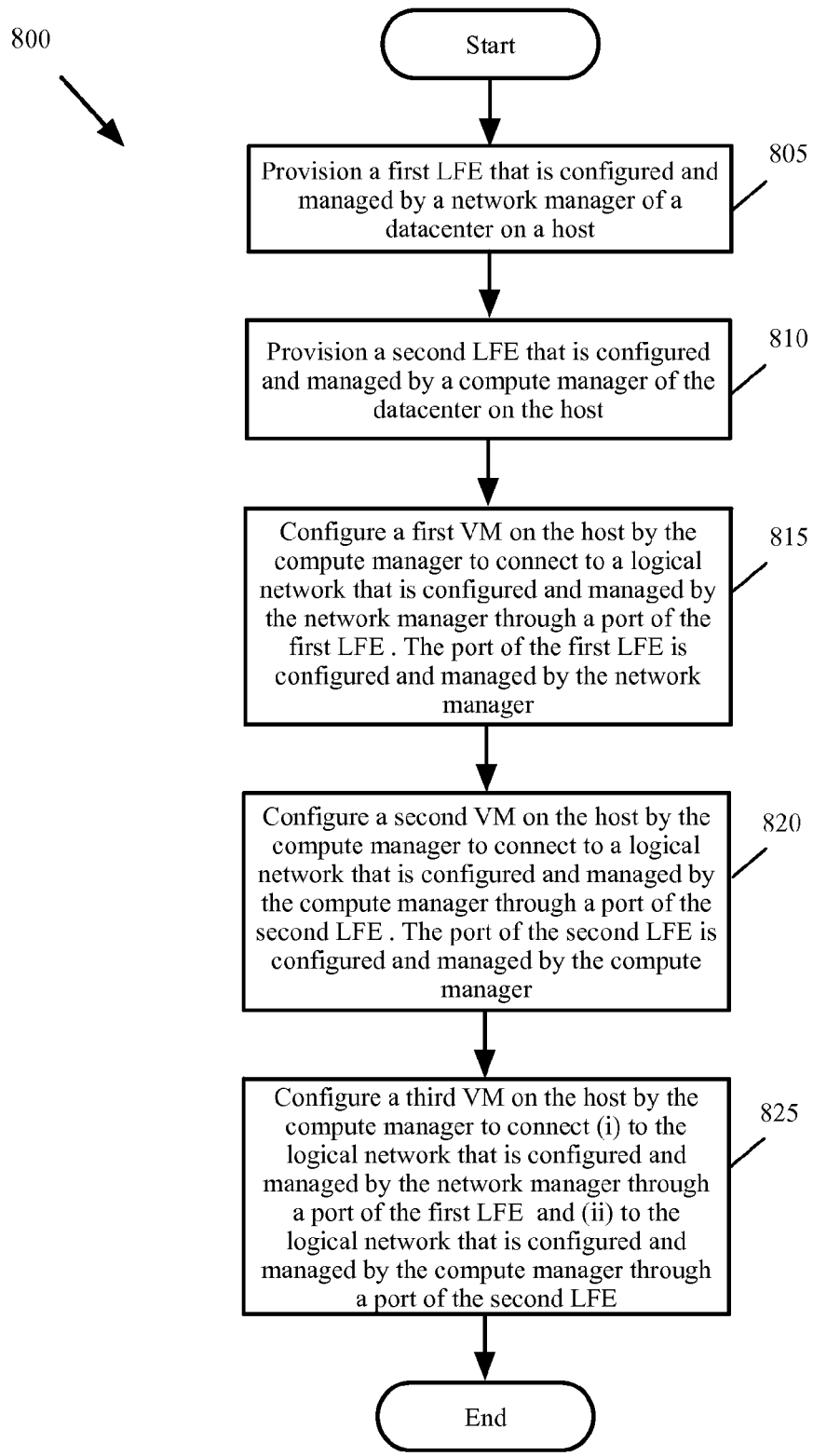
FIG. 8 conceptually illustrates a process for configuring multiple LFEs by different independent management entities in some embodiments of the invention.

FIG. 8 conceptually illustrates a process 800 for configuring multiple LFEs by different independent management entities in some embodiments of the invention. As shown, the process provisions (at 805) a first LFE that is configured and managed by the network manager on a host. The process then provisions (at 810) a second LFE that is configured and managed by the compute manager on the host.

The process then configures (at 815) a first VM on the host by the compute manager to connect to a logical network that is configured and managed by the network manager through a port of the first LFE. The port of the first LFE is configured and managed by the network manager. The process then configures (at 820) a second VM on the host by the compute manager to connect to a logical network that is configured and managed by the compute manager through a port of the second LFE. The port of the second LFE is configured and managed by the compute manager.

Next, the process optionally configures (at 825) a third VM on the host by the compute manager to connect (i) to the logical network that is configured and managed by the network manager through a port of the first LFE and (ii) to the logical network that is configured and managed by the compute manager through a port of the second LFE. The process then ends.

III. Creation and Use of Opaque Networks and Opaque Logical Forwarding Elements

An LFE in some embodiments no longer uses a port group that is created and managed by the compute manager (such as port groups 140 and 130 in FIG. 1) to connect to a network. Instead, as shown in FIG. 3, a VM virtual NIC 325 uses an opaque LFE that is created and managed by the network manager to connect to a network. Some embodiments provide a create-port and attach-port API call to network manager. This occurs via an inter-process communication (IPC) callback, e.g., from the compute management daemon 230 (shown in FIG. 4). In the create-port call, the network manager creates a port on the opaque LFE through signaling via the network manager agent 430. In the attach-port call, the network manager pushes the port to the host virtualization software via a controller messaging channel. The created port, for example port 375 shown in FIG. 3, is a standalone port (i.e. not contained in a traditional port group that is created and managed by the compute manager). However, the standalone port does continue to contain any required configuration (i.e. traditional LFE port properties).

Figure 9:
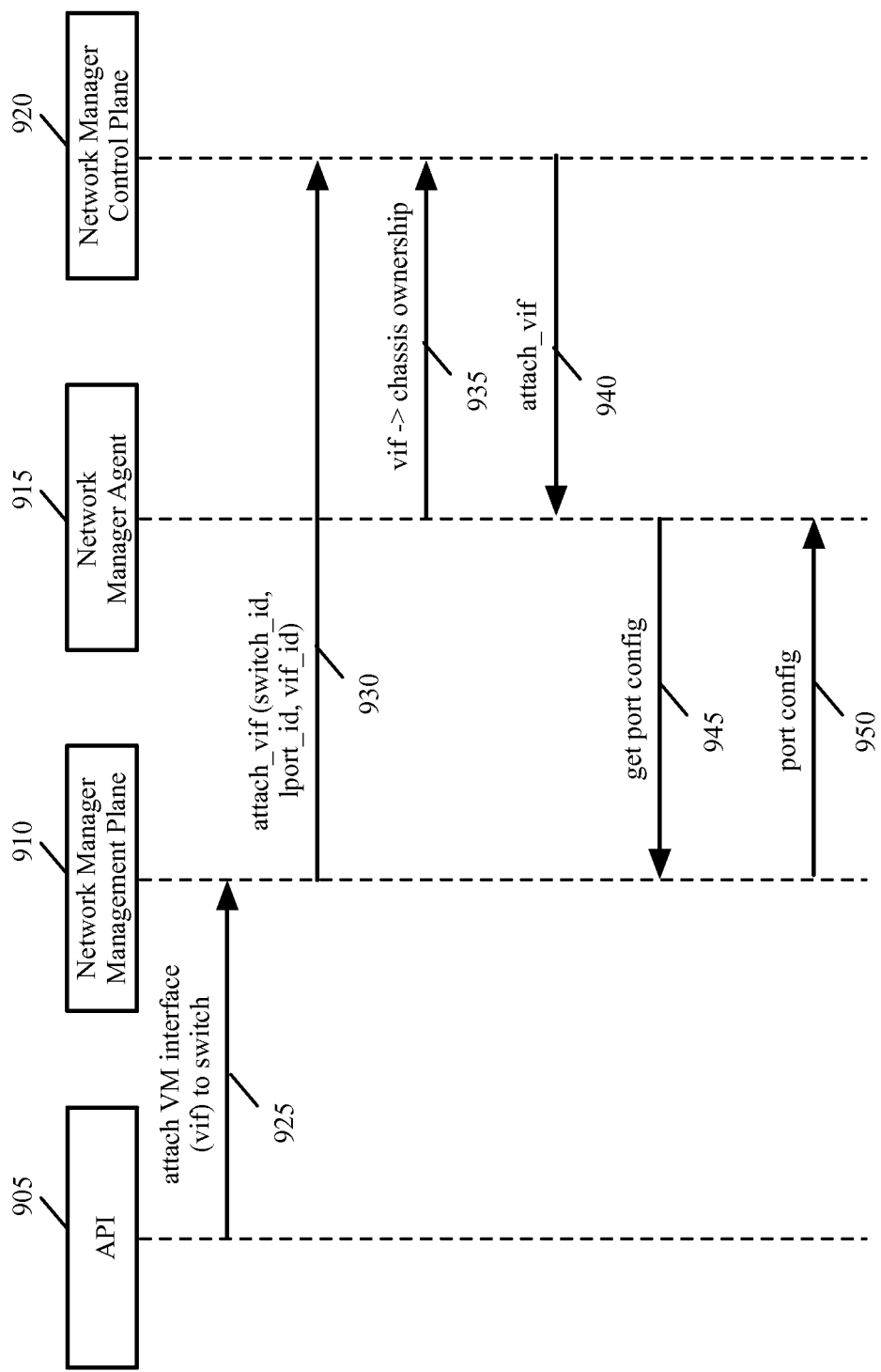
FIG. 9 illustrates port attachment workflows for attaching a port directly via the network manager in some embodiments of the invention.

FIG. 9 illustrates port attachment workflows for attaching a port directly via the network manager in some embodiments of the invention. As shown, the network manager management plane 910 receives a request (at 925) through an application programming interface (API) 905, command line interface (CLI), or user interface (UI) to attach a VM interface to an LFE. A VM's virtual interface (VIF) is used to connect VMs to an LFE. The attachment connects the VIF to a logical switch port.

The network manager management plane 910 sends a request (at 930) to the network manager control plane 920 to attach the VIF by providing the LFE identifier (which in some embodiments is the same as the logical network UUID), the VIF identifier (e.g., the VIF UUID), and the logical port's identifier. The management plane 910 of the network manager is the "desired state engine" and is used to create logical networks or specify new policies (e.g., firewall policy) for the network. The network manager control plane 920 is the "realized state engine" that maintains media access control (MAC) learning table for networking, learns MAC/IP address associations, handles address resolution requests (ARPs) for VMs, etc. The network manager control plane 920 resides alongside or within the network manager.

The network manager control plane 920 also receives a message (at 935) from the network manager agent 915 to inquire for the port ownership. The message is an inquiry to know which ports are on a host. The network manager control plane 920 sends (at 940) a message to the network manager agent 915 to attach the port to the VIF (i.e., pushes the port to the virtualization software of the host). The network manager agent 915 sends (at 945) a request to the network manager management plane 910 to get the port configuration. Finally, the network manager management plane 910 sends (at 950) the port configuration to the network manager agent 915. The network manager agent coordinates with the switching kernel (item 455 shown in FIG. 4) on the host to attach the VIF to the requested port (i.e., to attach the VM corresponding to the VIF to the requested port) on the opaque LFE proxy (item 445 shown in FIG. 4).

Figure 10:
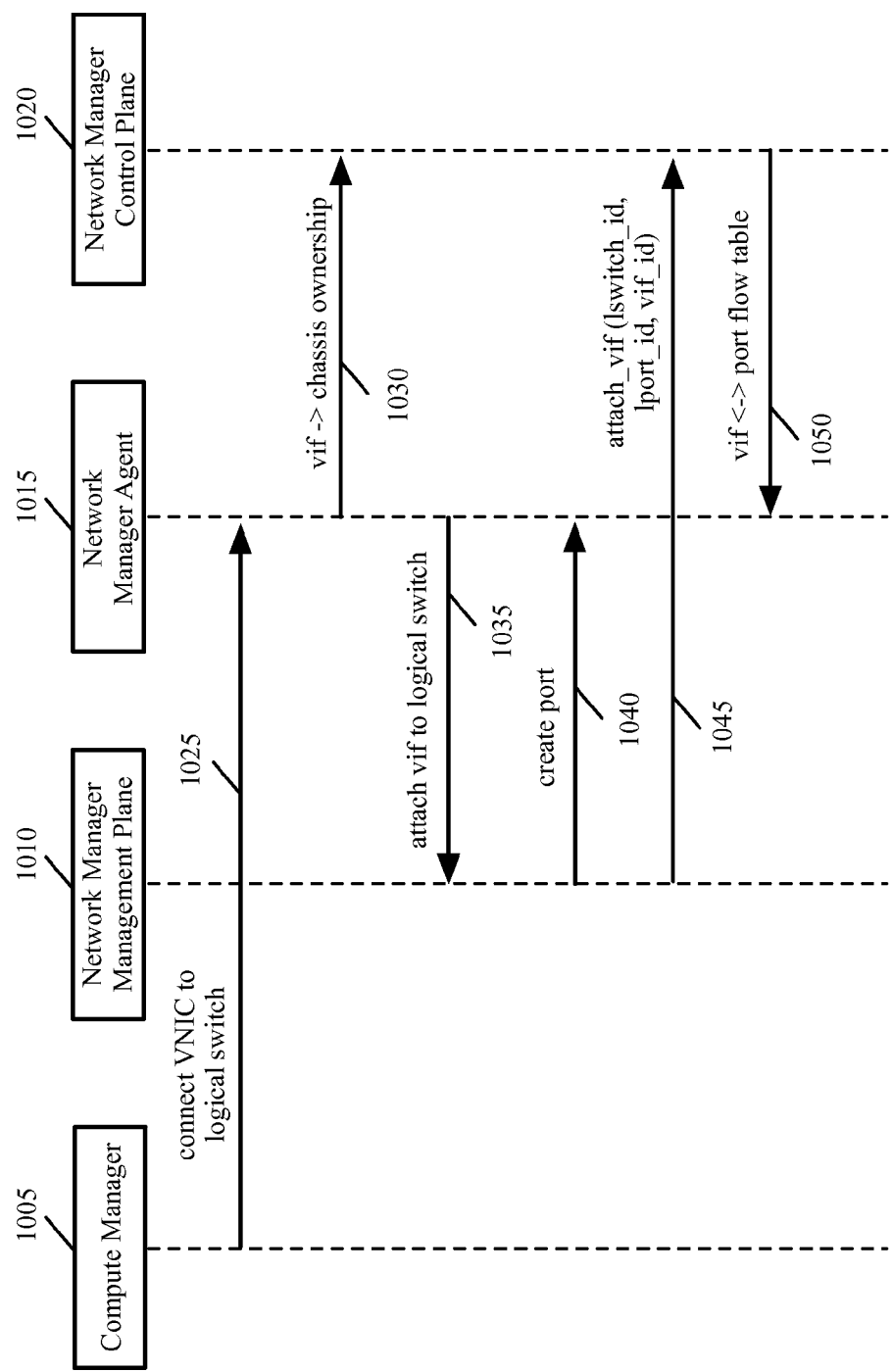
FIG. 10 illustrates port attachment workflows for attaching a port requested by the compute manager in some embodiments of the invention.

FIG. 10 illustrates port attachment workflows for attaching a port requested by the compute manager in some embodiments of the invention. As shown, the compute manager 1005 sends a request (at 1025) to the network manager management agent 1015 to connect a VM's VNIC to the opaque LFE. The network manager control plane 1020 receives a message (at 1030) from the network manager agent 1015 to inquire for the port ownership. The message is an inquiry to know which ports are on a host.

The network manager agent 1015 on the host sends (at 1035) a message to network manager management plane (1010) to attach the VIF to the opaque LFE. The network manager management plane 1010 sends a request (at 1040) a request to create the port to the network manager agent 1015. The network manager management plane 1010 also sends a request (at 1045) to the network manager control plane 1020 to attach the VIF by providing the opaque LFE identifier (e.g., the opaque network UUID), the VIF identifier (e.g., the VIF UUID), and the logical port identifier. The network manager control plane 1020 sends a message to provide (at 1050) the VIF port flow table to the network manager agent 1015. This message passes the opaque port state for feature configuration (i.e., the desired state) to the host for actually being realized on the port instance.

A cloud management system (e.g. Openstack) that prefers to handle ports directly can set a flag (e.g., "portAttach-Mode" flag) as "manual" in the opaque network. For a "manual" mode opaque network, the compute manager has to make explicit create-port and attach-port API calls on the network manager. The compute manager daemon (item 230 in FIG. 4) will only update the VM configuration and will not call the network manager.

The attach port operation in the network manager uses a VIF UUID that is set on the LFE port and "external identification" property of the virtual NIC. At VM power-on, the virtualization software does a reverse look up with the "external identification" property of the virtual NIC to find the LFE port and connect to it.

Opaque networks make it possible to decouple network management plane and compute manager plane. Opaque networks create an abstraction to present a logical network that can embody different technology or implementation. The opaque switch/LFE creates an abstraction for the collection of physical NICs used by an opaque network data path abstracting the physical layer from the logical space but maintaining the relationship. For instance, since an LFE spans across hosts, regardless of whether one host is connected physically with two 10 GB physical interfaces or another host is connected with only one 1 GB physical interface, the LFE is still going to have connectivity on the given network. This is the layer of abstraction the LFE is providing from the physical infrastructure for connectivity.

The presence of such an opaque network on virtualization software helps compute management plane determine the VM deployment scope, in case the VM is using the network. This is helpful for solutions such as distributed resource scheduling (DRS) where placement can be influenced by the network manager without actually changing the placement logic with the compute manager. In prior art, the network management plane had to resort to moving ports into a blocked state in such a scenario. Using the opaque networks and LFE, the network management plane can influence the compute manager to instead place the VM on a virtualization software with the required networking, reducing disruption for the end-user. For instance, if the network manager detects that a specific logical network is having issues, the network manager can choose to "hide" or pull back the network from the proxy. As a result, solutions such as DRS do not see the network anymore and will avoid moving existing VMs or placing new VMs requiring the specific network on the host. This is the out of band signaling power that is gained from having an asynchronous network centric control of specific network reflected into the compute manager.

The presence of an opaque switch allows compute construct feature configuration to be reflected into the networking layer. For example, in order to provide quick failover (or high availability), the network manager is able to associate a mirror (or shadow) port with a primary VM port to maintain the high availability association. This displays the loosely coupled nature of the system while allowing the integration for "compute" features. In order to provide quick failover, wherever the standby VM is running, a mirror (or shadow) of the active network port can be used to mirror the configurations for quick turnaround in the event of a failover from the primary VM to the standby VM.

For a cloud management service the opaque network allows maintaining the associations between the network layer and the compute layer from the VM inventory mappings rather than keeping a fully decoupled stack where neither system is aware of the other's presence. For bandwidth optimization and migration optimal path calculations, the opaque network allows further integration and influence of the network stack into the compute manager.

A. Data Sent from the Network Manager to the Virtualization Software and the Compute Manager In some embodiments, the network manager provides configuration construct of the logical networks and LFE as a set of read-only parameters to the virtualization software and the compute manager. In some embodiments, the compute manager receives these parameters directly from the network manager. In other embodiments the compute manager receives these parameters from the virtualization software of each host. The compute manager utilizes the parameters to configure VMs to connect to the logical network as well as providing other features such as moving a VM from one host to another, supporting fault tolerant VMs, supporting failover, etc.

The network manager abstracts the logical network and provides the abstraction parameters to the virtualization software compute manager to utilize the logical network. The abstraction parameters are utilized to determine, e.g., which host is connected to a logical network (e.g., which host is on which transport zone) and therefore facilitate connecting the VMs to the logical network, powering up or moving VMs to the hosts, etc.

In some embodiments the network manager provides the following information about an opaque network to the virtualization software and the compute manager. The network manager provides the opaque network unique identifier. In some embodiments, the unique identifier of the opaque network is the UUID of the opaque network.

The information provided by the network manager in some embodiments further includes the opaque network name. The information further includes the network type. Examples of the network type include VXLAN, NVGRE, etc., as described above. The information further includes the unique identifier of the transport zone associated with the opaque network. In some embodiments, the unique identifier of the transport zone is the UUID of the transport zone.

In some embodiments the network manager provides the following information about an opaque LFE to the virtualization software and the compute manager. The network manager provides the list of physical NICs (PNICs) connected to the opaque LFE. The information also includes the list of transport zone unique identifiers. In some embodiments, the unique identifier of a transport zone is the UUID of the transport zone. The information also includes the status of the opaque LFE score (e.g., a numerical or multi-level health score of the LFE). The health score in some embodiments is calculated by the load, performance, and/or synchronization state of the specific logical network. For instance, if the load on a specific network on a specific host is getting over a threshold to manage, the health score deteriorates. Similarly, if an unusual number of packet drops are being detected or if there is a loop causing issues for the network, the health score will similarly drop. Another example is when a logical network has a configuration changed in the management plane that has not yet propagated to all of the LFE instances across the network, the VMs using that network can be signaled not re-balance until the sync state is completed.

When a host joins a transport zone, all logical networks in the transport zone are inserted to the host as available opaque networks. In VM migration or power-on placement in DRS, compute manager checks whether the destination host has the required opaque network available on the host. VMs that are connected to the same opaque network are deemed to have L2 connectivity between them (i.e., the opaque network is an embodiment of virtual L2). The opaque network is associated with a transport zone UUID that can be correlated to one of transport zones associated with the opaque LFE, which the compute manager can use to find out the physical NICs used to provide the networking to the opaque network.

Providing the opaque networks and LFE information to the compute manager facilitates the following features by the compute manager. Compute manager features like DRS, quick failover, fault tolerance, moving a VM from one host to another depend on opaque network spans to make sure VM is placed where it can maintains network connectivity.

Compute manager features like network load balancing depends on the physical NIC information on the opaque switch (correlated to the opaque network used in virtual NIC via transport zone UUID) to do network bandwidth resource planning Compute manager features like the number of VMs that can concurrently be moved from one host to another (which is controlled by the bandwidth of physical NIC connected the virtual NIC) depends on opaque switch to provide physical NIC information for an opaque network. For instance, when there are only two physical links on a given host, both physical links are used for all traffic (e.g., to provide quick failover). The physical NIC information can be used to prioritize the traffic. For instance, the tenant VM traffic gets the highest priority followed by the control traffic, and the management traffic.

Compute manager features like VM migration compatibility checks depend on the opaque switch status to prevent VM from losing network by moving to a host whose opaque switch status is "unavailable".

In the virtualization software, the following data are communicated/maintained. In a VM provisioning operation, the virtual NIC and opaque network information are sent to the network manager agent. The network manager agent then allocates the port, attaches the port to the VNIC VIF UUID and creates the port in the virtualization software.

In the virtualization software, the port to VIF attachment is maintained/persisted on the virtualization software in a mapping table. In VM power-on (virtual NIC device connected and link-up), virtualization software does reverse look up in the mapping table based on the virtual NIC VIF UUID to find the port and connects the port with the virtual NIC. In the virtualization software, the network manager agent sets the port's network configuration/policy based on what is provisioned on the network manager. This allows new features to be added to the port without virtualization software platform changes.

B. Creation of an Opaque LFE

Figure 11:
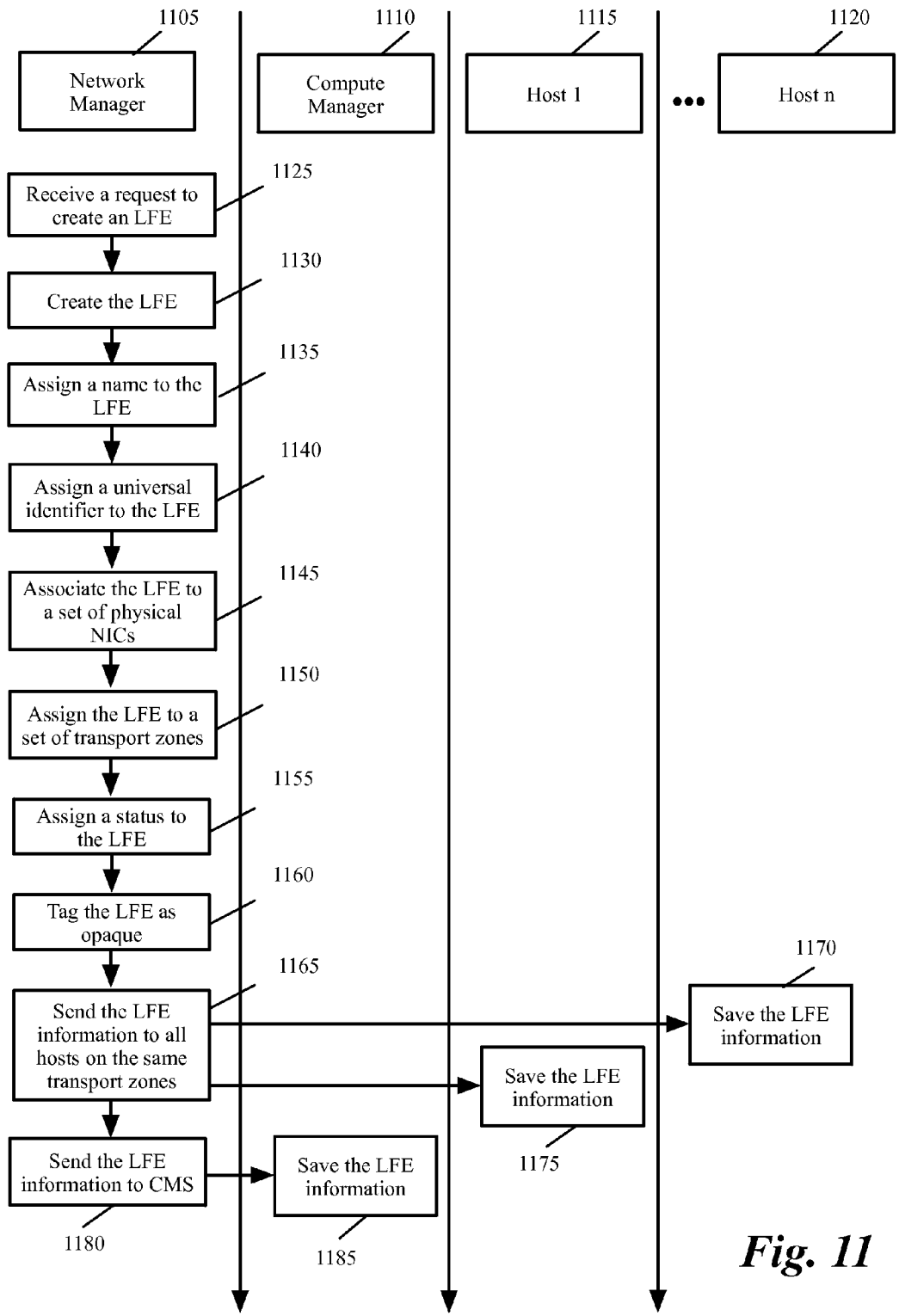
FIG. 11 is a swim lane diagram that conceptually illustrates different actions by the network manager, the compute manager, and different hosts for creating and saving copies of an LFE in some embodiments of the invention.

FIG. 11 is a swim lane diagram that conceptually illustrates different actions by the network manager 1105, compute manager 1110, and different hosts 1115-1120 for creating and saving copies of an LFE in some embodiments of the invention. As shown, network manager 1105 receives (at 1125) a request (e.g., through a UI or an API) to create an LFE. The network manger then creates (at 1130) the LFE.

The network manager then assigns (at 1135) a name to the LFE. Next, the network manager assigns (at 1140) a universal identifier such as a UUID to the LFE. The network manager then associates (at 1145) the LFE to a set of physical NICs.

Next, the network manager assigns (at 1150) the LFE to a set of transport zones. A transport zone is a representation of the physical network and defines which transport nodes a network spans. Transport nodes include VMs, virtualization software (hypervisors), gateways, etc. Transport nodes and transport zones make a transport network. The network manager then assigns (at 1155) a status to the LFE (e.g., a numerical or multi-level health score).

The network manager then tags (at 1160) the LFE as opaque. The network manager then sends (at 1165) the LFE information to all hosts where the transport zones associated with the LFE are available. The hosts 1115-1120) save (at 1170-1175) the LFE information. The compute manager can obtain LFE information from hosts 1115-1120, or, in alternate embodiments, the network manager sends, or also sends, (at 1180) the LFE information directly to compute manager (1110). The compute manager also saves (at 1185) the LFE information.

C. Creation of an Opaque Logical Network

Figure 12:
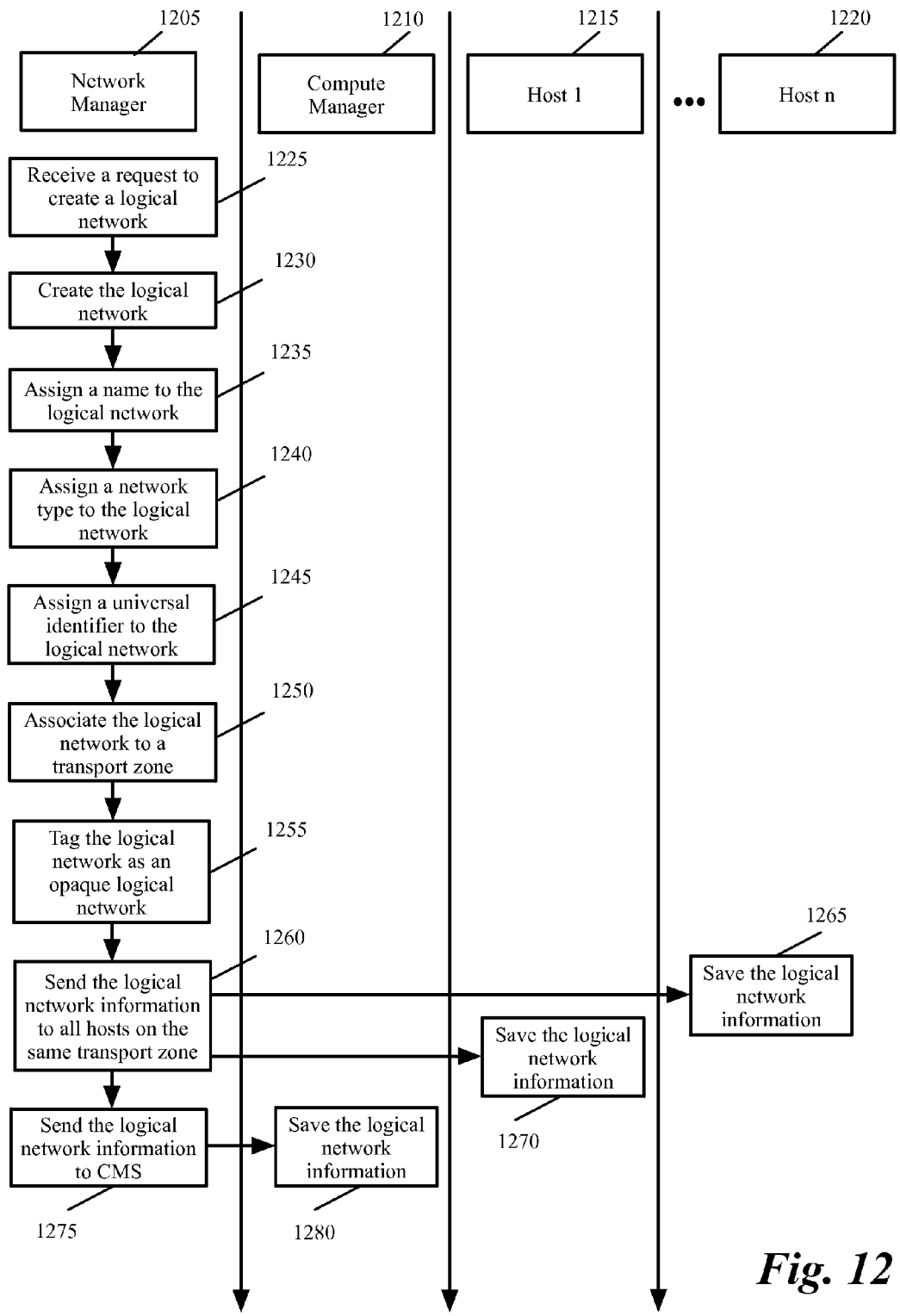
FIG. 12 is a swim lane diagram that conceptually illustrates different actions by the network manager, the compute manager, and different hosts for creating and saving copies of a logical network in some embodiments of the invention.

FIG. 12 is a swim lane diagram that conceptually illustrates different actions by the network manager, the compute manager, and different hosts for creating and saving copies of a logical network in some embodiments of the invention. As shown, the network manager 1205 receives (at 1225) a request (e.g., through a UI or an API) to create a logical network. In some embodiments, there is a one-to-one correspondence between an LFE and a logical network where the LFE is a virtual switch that defines the logical network. The logical network can be viewed as the instantiation in the network management subsystem representing the network object while the LFE can be viewed as the instantiation of the logical network on a given forwarding engine on virtualization software.

The network manger then creates (at 1230) the logical network. The network manager then assigns (at 1235) a name to the logical network. Next, the network manager assigns (at 1240) a network type (e.g., VXLAN, NVGRE, etc., as described above) to the logical network. The network manager then assigns (at 1245) a universal identifier such as a UUID to the logical network. The network manager then associates (at 1250) the logical network to a of transport zone. The network manager then tags (at 1255) the logical network as opaque. The network manager then sends (at 1260) the logical network information to all hosts on the same transport zone.

The hosts 1215-1220 save (at 1265-1270) the logical network information. The network manager may also send (at 1257) the logical network information to compute manager (1210). The compute manager also saves (at 1280) the LFE information.

D. Sending LFE Information to a New Host

Figure 13:
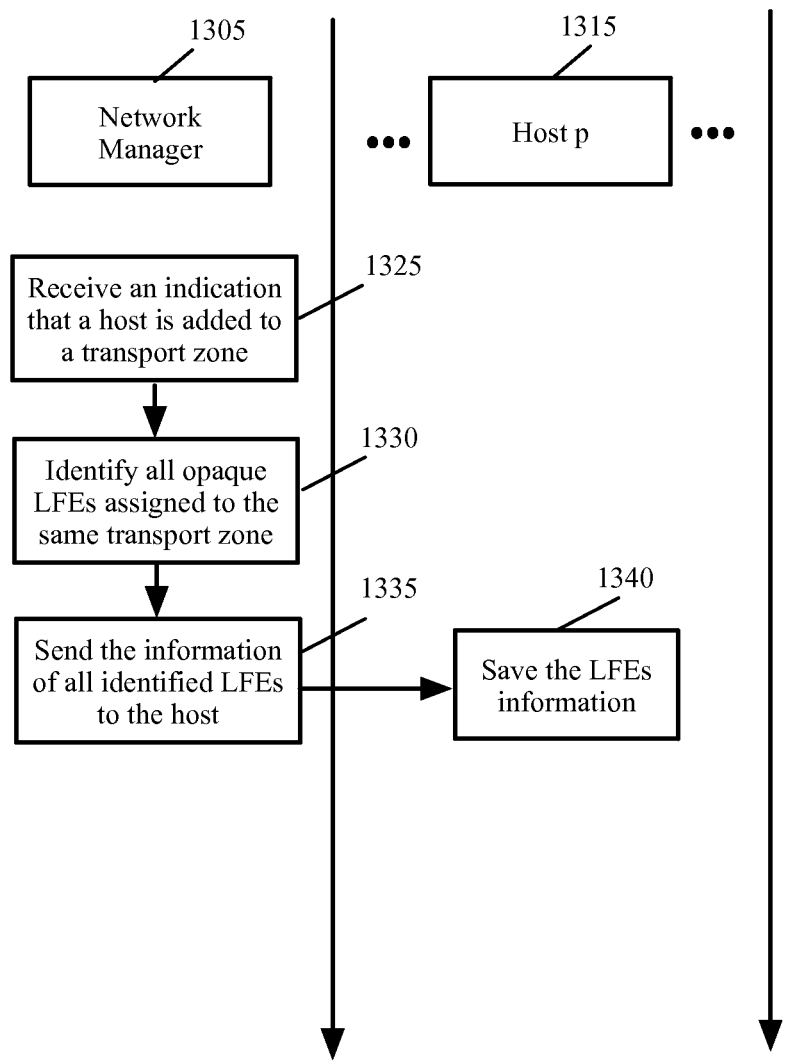
FIG. 13 is a swim lane diagram that conceptually illustrates different actions by the network manager and a host, when the host is added to a transport zone in some embodiments of the invention.

FIG. 13 is a swim lane diagram that conceptually illustrates different actions by the network manager and a host, when the host is added to a transport zone in some embodiments of the invention. As shown, the network manger 1305 receives (at 1325) an indication that a host 1315 is added to a transport zone. The network manager 1305 identifies (at 1330) all opaque LFEs assigned to the same transport zone.

The network manager sends (at 1335) the information of all identified LFEs to the host. For instance, the LFE information in some embodiments includes the list of PNICs connected to the LFE, the list of identifiers (e.g., UUIDs) of the transport zones associated with the LFE, and the health status of the LFE. The host 1315 saves (at 1340) the LFEs information.

E. Power-On Placement of a VM on a Host

Figure 14:
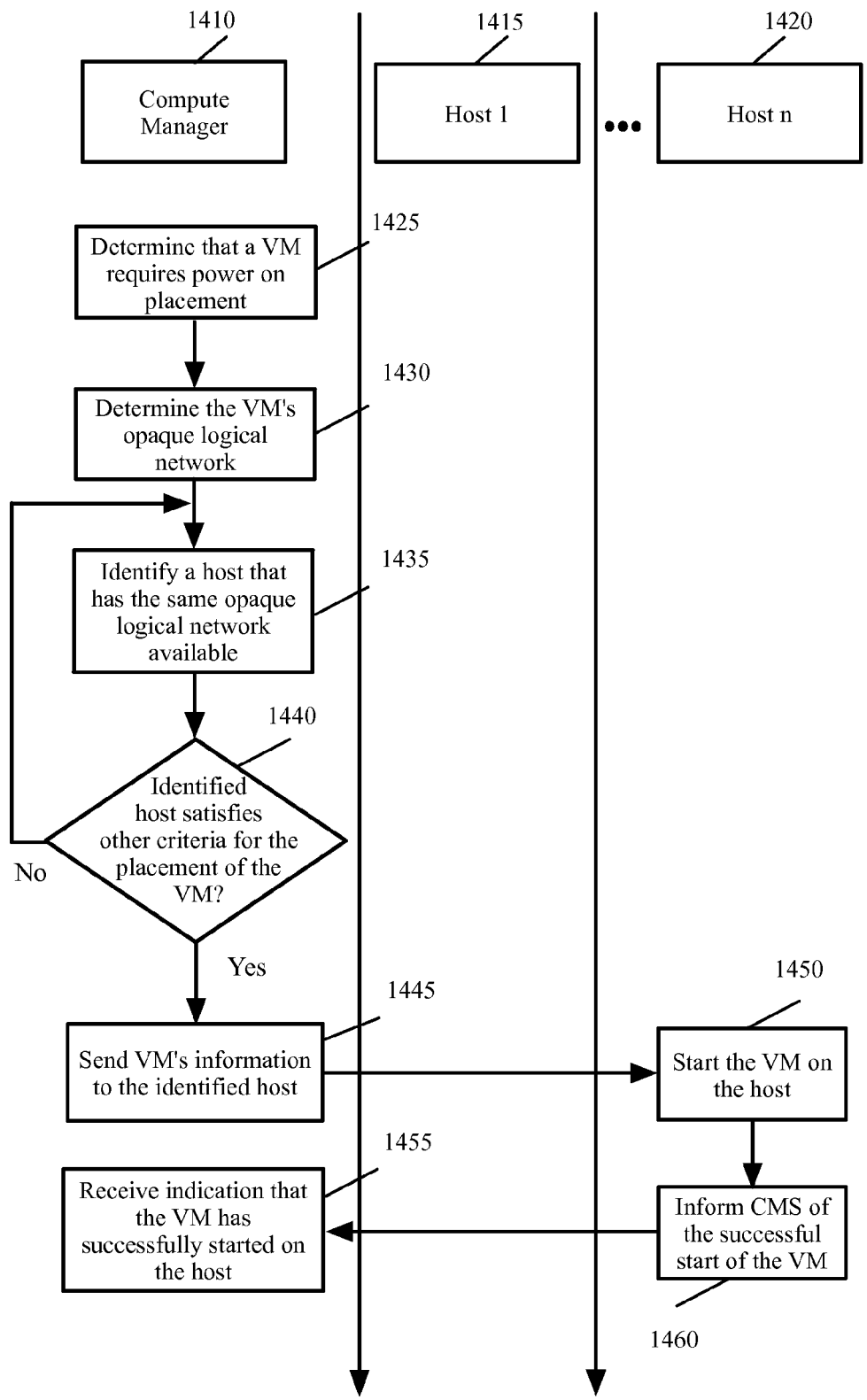
FIG. 14 is a swim lane diagram that conceptually illustrates different actions by the compute manager and a host, when a VM is added to the host in some embodiments of the invention.

FIG. 14 is a swim lane diagram that conceptually illustrates different actions by the compute manager and a host, when a VM is added (e.g., after a restart or initial deployment) to the host in some embodiments of the invention. As shown, a service such as distributed resource scheduler (DRS) on the compute manager 1410 determines (at 1425) that a VM requires power on placement on a host. The DRS then determines one of the hosts 1415-1420 for the placement of the VM.

The DRS determines (at 1430) the VM's opaque logical network. As described above, when a host joins a transport zone, the host receives the information about the opaque LFEs assigned to the transport zone. The DRS determines (e.g., by looking up the VM's configuration information or receiving information from the network manager) the opaque LFE that is connected to the VM's VNIC and the UUID of the transport zone connecting to the VNIC through the LFE. The DRS uses the UUID of the transport zone to identify the opaque network (as described above, when an opaque network is created, the hosts and the compute manager receive information about the opaque network including the UUID of the associated transport zone). In other words, the compute manager looks up a given VM's VNIC connection state and discovers the LFE on the host to which the VNIC is connected representing the logical network. The LFE is then mapped to the logical network by the logical network UUID stored on the host.

The DRS then identifies (at 1435) a host that has the same opaque logical network available. The DRS then determines (at 1440) whether the identified host satisfies other criteria for the placement of the VM. For instance, the hosts in some embodiments are score for placement of VMs based on whether the hosts have enough processing power, storage, or communication bandwidth available for hosting the VM. Another factor used in some embodiments to score the hosts is the availability of ports on the LFEs. The availability of the logical network and LFE constructs on the virtualization software of each host allows the score of each host to be determined and stored locally at the host. The local availability of the score enables rapid determination of whether a host is eligible to receive a VM.

If not, the process proceeds to 1435, which was described above. Otherwise, the DRS sends (at 1445) the VM's information to the identified host 1420. The host 1420 then starts (at 1450) the VM. The host then informs (at 1460) the compute manager of the successful start of the VM. The DRS receives (at 1455) the indication that the VM has successfully started on the host.

F. Moving a VM Between Hosts

The opaque networks are network manager controller entities starting from the creation and through the subsequent lifecycle management. Since the opaque network is not owned or published by the compute manager, the compute manager utilizes the read-only logical network constructs provided by the network manager to the virtualization software of the hosts to determine whether a given logical network operates on a specific host. If a set of hosts each contains a network construct with the same unique identifier, a VM can be moved between the set of hosts, which are members of this network.

Figure 15:
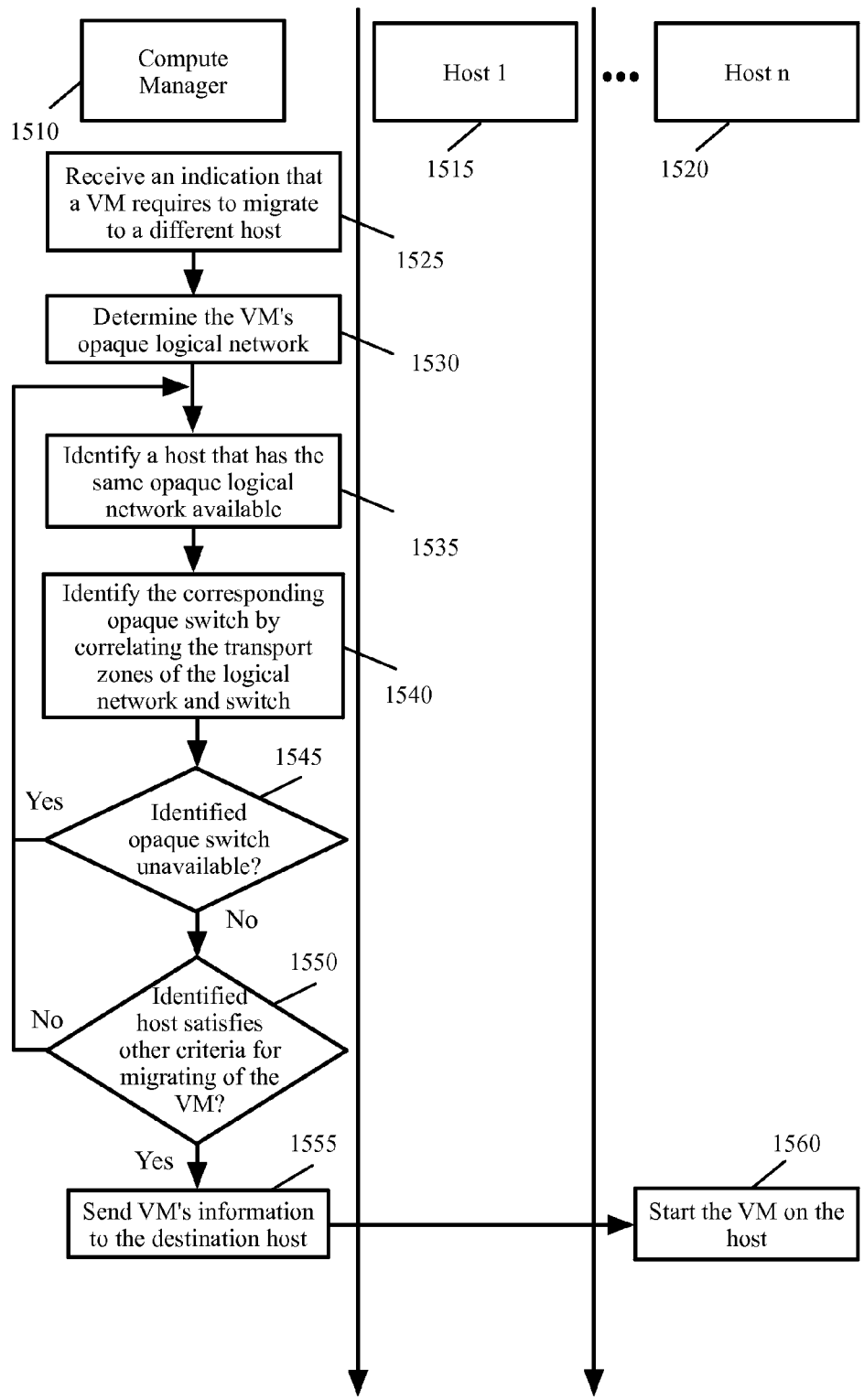
FIG. 15 is a swim lane diagram that conceptually illustrates different actions by the compute manager and two hosts, when a VM is moved from one of the host to the other in some embodiments of the invention.

FIG. 15 is a swim lane diagram that conceptually illustrates different actions by the compute manager and two hosts, when a VM is moved from one of the host to the other. As shown, a service on the compute manager 1510 that coordinates VM migrations receives (at 1525) an indication that a VM requires to migrate to a different host.

Live migration of a VM, which entails migrating a VM that is running on a first host to a second without any downtime in the operation of the VM, is a known and pervasive technology in modern datacenters and provides several advantages. For instance, all VMs operating on a first host can migrate to a second host without any downtime in anticipation of conducting hardware maintenance on the first host. VMs can be moved from one host to another for load balancing the hosts' resources. VMs can be proactively moved away from failing or underperforming hosts. For instance, one or more VMs can migrate from a host when utilization of a certain resource such as processing, storage, or communication bandwidth on the host exceeds a predetermined threshold. The VMs can migrate to one or more other hosts with extra resource capacities. The VMs can also be consolidated on fewer hosts when activity (i.e., resource requirements) is low, allowing the extra hosts to be turned off (or place them in standby) and save power.

The compute manager then determines (at 1530) the VM's logical network. As described above, when a host joins a transport zone, the host receives the information about the opaque LFEs assigned to the transport zone. The service on the compute manager 1510 that coordinates the VM migrations determines (e.g., by looking up the VM's configuration information or receiving information from the network manager) the opaque LFE that is connected to the VM's VNIC and the UUID of the transport zone connecting to the VNIC through the LFE. The service uses the UUID of the transport zone to identify the opaque network (as described above, when an opaque network is created, the hosts and the compute manager receive information about the opaque network including the UUID of the associated transport zone). The compute manager then identifies (at 1535) a potential destination host that has the same opaque logical network available. The compute manager then identifies (at 1540) the corresponding opaque switch by correlating the transport zones of the opaque logical network and the opaque switch. The compute manager then determines (at 1545) whether the status of the opaque switch indicates that the switch is unavailable (or unhealthy). In some embodiments, a status of unavailable indicates that the opaque switch is not ready to have VMs connected (e.g., the opaque switch may not have an available port for a VM to connect). If yes, the compute manager proceeds to 1535, which was described above.

If not, the compute manager determines (at 1550) whether the identified host satisfies other criteria for the placement of the VM. For instance, whether the host has enough processing power and storage available for hosting the VM. If not, the process proceeds to 1535, which was described above, to identify a different potential destination host 1520. Otherwise, the compute manager sends (at 1555) the VM's information to the identified destination host.

The destination host 1520 starts (at 1560) the VM on the host. Live migration is orchestrated by compute manager 1510, source host 1515, and destination host 1520. Although FIG. 15 simplifies the process, in some embodiments, the data stored in the memory of the VM executing in source host 1515 is copied to destination host 1520 iteratively. That is, it is initially copied, then pages changed since the initial copy are sent, then pages that were modified since the previous transmission is sent, etc., until a sufficiently small working set of memory being changed remains at source host 1515. The VM is then stunned, and the remaining working set of memory and other state information, i.e., of the processor, etc., is transmitted to destination host 1520, whereupon the VM is immediately resumed on destination host 1520. The VM may be stunned typically for just a fraction of a second and thus no downtime is noticeable. It should be noted that while this process describes a live migration of the VM, it is also possible to perform steps 1525-1555 with non-live migration, in which the VM is simply shut down on the source host and then started on the destination host. In this case, downtime of the VM would be on the order of a number of minutes, but would of course vary depending on the guest operating system and software, disk storage latency and throughput, and processor resources available to the VM on the source and destination.

G. Supporting Fault Tolerant VMs

Figure 16:
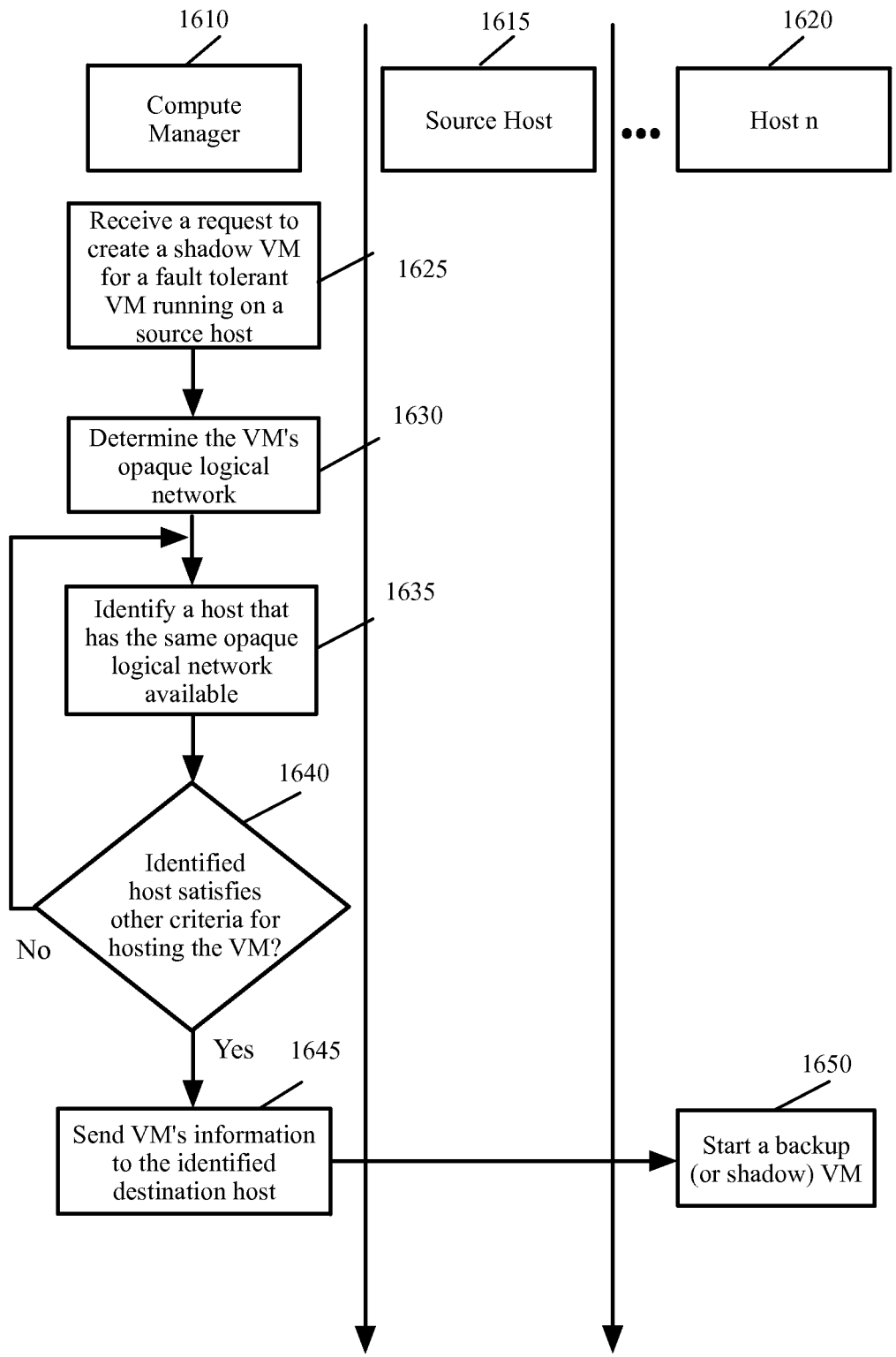
FIG. 16 is a swim lane diagram that conceptually illustrates the support of fault tolerant VMs in some embodiments of the invention.

FIG. 16 is a swim lane diagram that conceptually illustrates the support of fault tolerant VMs in some embodiments of the invention. As shown, a service on the compute manager 1610 receives (at 1625) a request to create a backup (or shadow) VM for a primary (or fault tolerant) VM running on a source host 1615. The compute manager determines (at 1630) the VM's opaque logical network. As described above, when a host joins a transport zone, the host receives the information about the opaque LFEs assigned to the transport zone. The compute manager determines (e.g., by looking up the VM's configuration information or receiving information from the network manager) the opaque LFE that is connected to the VM's VNIC and the UUID of the transport zone connecting to the VNIC through the LFE. The compute manager uses the UUID of the transport zone to identify the opaque network (as described above, when an opaque network is created, the hosts and the compute manager receive information about the opaque network including the UUID of the associated transport zone).

The compute manager then identifies (at 1635) a host that has the same opaque logical network available. The compute manager then determines (at 1640) whether the host satisfies other criteria for hosting the VM. If not, the compute manager proceeds to 1635, which was described above. Otherwise, the compute manager sends (at 1645) the VM's information to the identified destination host.

The destination host 1620 starts (at 1650) a shadow VM. Different embodiments provide different fault tolerant VMs. In some embodiments, the primary VM continuously transmits event data to the backup VM, which runs in lock step, a few milliseconds behind the primary. The backup VM is prevented from communicating with the outside world, but events identified at the primary VM are injected at the exact right moment of execution of the destination VM (i.e., when the instruction pointer hits the correct point in execution, so that the backup VM does not deviate from the execution of the primary VM). If the primary VM fails, it is halted and the backup VM continues execution but is now allowed to communicate with the outside world in place of the primary. Other embodiments use rapid checkpointing, where the backup VM is not running, but its state (e.g., memory) is constantly updated with state information from the primary VM. If the primary fails, the backup VM is started from the last good state update, without any noticeable downtime.

H. Supporting High Availability for VMs

Figure 17:
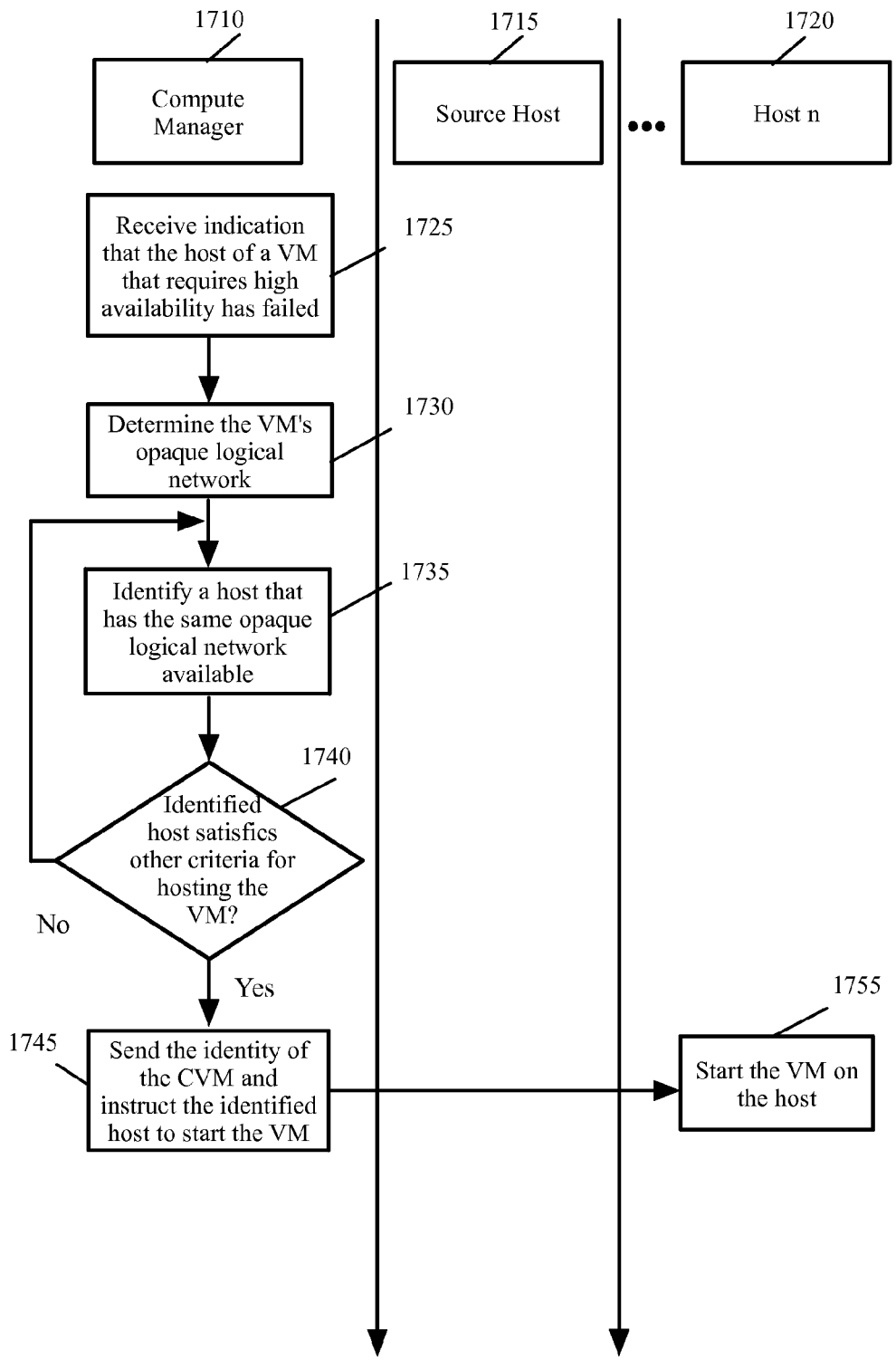
FIG. 17 is a swim lane diagram that conceptually illustrates the support of high availability for VMs in some embodiments of the invention.

FIG. 17 is a swim lane diagram that conceptually illustrates the support of high availability for VMs in some embodiments of the invention. As shown, a service that provides high availability on the compute manager 1710 receives (at 1725) an indication that the host 1715 of a VM that requires high availability has failed. For example, a heartbeat signal periodically transmitted from the host to the compute manager may have halted.

The compute manager determines (at 1730) the VM's opaque logical network. The compute manager then identifies (at 1735) a potential new host that has the same opaque logical network available. The compute manager then determines (at 1740) whether the host satisfies other criteria for hosting the VM. If not, the compute manager proceeds to 1735, which was described above, to identify a different potential new host. Otherwise, the compute manager 1710 sends the identity of the VM to the new host 1720 and instructs (at 1745) the new host 1720 to start the VM. The new host 1720 then starts (at 1755) the VM by reading the VM's configuration information from a configuration file in storage. Once the VM is started, the VM begins booting the operating system from storage in the normal process.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 18 conceptually illustrates an electronic system 1800 with which some embodiments of the invention are implemented. The electronic system 1800 can be used to execute any of the control, virtualization, compute manager, network manager, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1820, a read-only memory (ROM) 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1820, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1820 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1820, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures including FIGS. 5 and 8-17 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

A hypervisor kernel network interface module, in some embodiments, is a non-VM DCN that includes a network stack with a hypervisor kernel network interface and receive/transmit threads. One example of a hypervisor kernel network interface module is the vmknic module that is part of the ESX® hypervisor of VMware® Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of migrating a data compute node (DCN) in a datacenter comprising a plurality of host physical computing devices, a compute manager to configure a set of DCNs on the hosts, and a network manager, each host comprising virtualization software, the method comprising:
    by the compute manager, configuring at least one DCN on each of the plurality of hosts;
    by the network manager, configuring a plurality of logical networks and providing a read-only configuration construct of at least one of the plurality of logical networks to the virtualization software of each host, the read-only configuration construct of each logical network comprising a unique identification of the logical network;
    by the compute manager:
        obtaining, from the virtualization software of a first host, the unique identification of a particular logical network included in the read-only configuration construct of the particular logical network, the particular logical network connected to a DCN configured on the first host;
        determining that the particular logical network is available on a second host based on the unique identification of the particular logical network; and
        configuring the DCN to migrate from the first host to the second host based on the determination that the second host is on the particular logical network.

2. The method of claim 1 further comprising:
    by the network manager:
        configuring a logical forwarding element (LFE) on each of the plurality of hosts to perform open systems interconnection (OSI) model layer 3 (L3) packet forwarding between DCNs of the hosts, the LFE comprising a plurality of ports; and
        connecting each of a set of DCNs of the virtualization software of the second host to the particular network through a set of ports in the plurality of LFE ports,
    wherein configuring the first DCN to move from the first host to the second host is based on an availability of a free LFE port on the second host.

3. The method of claim 1 further comprising determining a utilization of a set of resources on each host by the virtualization software of the corresponding host, wherein configuring the first DCN to move from the first host to the second host is based on a determination that the utilization of each resource in the set of resources on the second host is below a predetermined threshold.

4. The method of claim 1, wherein the unique identification of each logical network is a universal unique identification (UUID) of the logical network.

5. The method of claim 1, wherein the virtualization software of the first host obtains the unique identification of the particular logical network from the network manager.

6. The method of claim 1 further comprising determining by the compute manager that the first host requires maintenance,
    wherein configuring the first DCN to move from the first host to the second host is in response to determining that the first host requires maintenance.

7. The method of claim 1 further comprising determining by the compute manager that utilization of a particular resource on the first host has exceeded a predetermined threshold,
    wherein configuring the first DCN to move from the first host to the second host is in response to determining that the first host has exceeded utilization of the particular resource.

8. The method of claim 7, wherein the particular resource is one of processing, memory, and communication bandwidth.

9. The method of claim 1 further comprising determining by the compute manager that resources of the first and second hosts are underutilized, wherein configuring the first DCN to move from the first host to the second host is in response to determining that resources of the first and second hosts are underutilized to turn off the power on the first host after moving the first DCN to the second host.

10. The method of claim 1, wherein the DCN is a virtual machine (VM).

11. A system comprising:
a plurality of host physical computing devices, each host comprising virtualization software;
a compute manager to configure at least one data compute node DCN on each of the plurality of the hosts;
a network manager to configure a plurality of logical networks and provide a read-only configuration construct of at least one of the plurality of logical networks to the virtualization software of each host, the read-only configuration construct of each logical network comprising a unique identification of the logical network;
the compute manager further to:
  obtain, from the virtualization software of a first host, the unique identification of a particular logical network included in the read-only configuration construct of the particular logical network, the particular logical network connected to a DCN configured on the first host;
  determine that the particular logical network is available on a second host based on the unique identification of the particular logical network; and
  configure the DCN to migrate from the first host to the second host based on the determination that the second host is on the particular logical network.

12. The system of claim 11, the network manager further to:
  configure a logical forwarding element (LFE) on each of the plurality of hosts to perform open systems interconnection (OSI) model layer 3 (L3) packet forwarding between DCNs of the hosts, the LFE comprising a plurality of ports; and
  connect each of a set of DCNs of the virtualization software of the second host to the particular network through a set of ports in the plurality of LFE ports,
  wherein configuring the first DCN to move from the first host to the second host is based on an availability of a free LFE port on the second host.

13. The system of claim 11, wherein the virtualization software of each host is configured to determine a utilization of a set of resources on the host, wherein configuring the first DCN to move from the first host to the second host is based on a determination that the utilization of each resource in the set of resources on the second host is below a predetermined threshold.

14. The system of claim 11, wherein the unique identification of each logical network is a universal unique identification (UUID) of the logical network.

15. The system of claim 11, wherein the virtualization software of the first host obtains the unique identification of the particular logical network from the network manager.

16. The system of claim 11, the compute manager further to determine that a host requires maintenance,
  wherein configuring the first DCN to move from the first host to the second host is in response to determining that the first host requires maintenance.

17. The system of claim 11, wherein the compute manager is further to determine that utilization of a particular resource on a host has exceeded a predetermined threshold,
  wherein configuring the first DCN to move from the first host to the second host is in response to determining that the first host has exceeded utilization of the particular resource.

18. The system of claim 17, wherein the particular resource is one of processing, memory, and communication bandwidth.

19. The system of claim 11, the compute manager further to:
  determine that resources of the first and second hosts are underutilized, wherein configuring the first DCN to move from the first host to the second host is in response to determining that resources of the first and second hosts are underutilized to turn off the power on the first host after moving the first DCN to the second host.

20. The system of claim 11, wherein the DCN is a virtual machine (VM).

* * * * *